United States Patent
Chuang et al.

(10) Patent No.: US 10,811,962 B2
(45) Date of Patent: Oct. 20, 2020

(54) MULTI-LEVEL SWITCHING POWER CONVERTER, AND CONTROLLER CIRCUIT AND CONTROL METHOD THEREOF

(71) Applicant: RICHTEK TECHNOLOGY CORPORATION, Zhubei, Hsinchu (TW)

(72) Inventors: Yung-Chun Chuang, Taipei (TW); Tsung-Wei Huang, Taipei (TW)

(73) Assignee: RICHTEK TECHNOLOGY CORPORATION, Zhubei, Hsinchu (TW)

(*) Notice: Subject to any disclaimer, the term of this patent is extended or adjusted under 35 U.S.C. 154(b) by 0 days.

(21) Appl. No.: 16/680,599

(22) Filed: Nov. 12, 2019

(65) Prior Publication Data
US 2020/0161967 A1    May 21, 2020

Related U.S. Application Data

(63) Continuation-in-part of application No. 16/653,940, filed on Oct. 15, 2019.

(30) Foreign Application Priority Data

Nov. 20, 2018 (CN) .......................... 2018 1 1381770

(51) Int. Cl.
*H02M 3/158* (2006.01)
*H02M 3/07* (2006.01)
*H02M 1/00* (2006.01)

(52) U.S. Cl.
CPC ...... *H02M 3/07* (2013.01); *H02M 2001/0025* (2013.01)

(58) Field of Classification Search
CPC ........ H02M 3/158; H02M 3/07; H02M 3/073; H02M 2007/4835
See application file for complete search history.

(56) References Cited

U.S. PATENT DOCUMENTS

| 2004/0095081 A1* | 5/2004 | Kernahan | .......... H05B 41/2827 315/307 |
| 2004/0095108 A1* | 5/2004 | Kernahan | ............ H03K 19/215 323/282 |
| 2004/0095112 A1* | 5/2004 | Kernahan | .......... H02M 1/0845 323/282 |
| 2004/0095116 A1* | 5/2004 | Kernahan | ................. G06F 1/24 323/282 |

(Continued)

*Primary Examiner* — Thienvu V Tran
*Assistant Examiner* — Sisay G Tiku
(74) *Attorney, Agent, or Firm* — Tung & Associates

(57) ABSTRACT

A multi-level switching power converter includes a multi-level power stage circuit which converts an input power to an output power. The power stage circuit includes an inductor, a conversion capacitor and plural power switches. The controller circuit controls the multi-level power stage circuit and includes: a feedback pulse generator circuit which generates a trigger pulse; a first timer circuit and a second timer circuit which determine a first time period and a second time period respectively according to the trigger pulse; and an adjusting circuit which adjusts the first time period according to a difference between the voltage across the conversion capacitor and a reference voltage such that an average of the voltage across the conversion capacitor is substantially equal to a level of the reference voltage.

18 Claims, 26 Drawing Sheets

(56) References Cited

U.S. PATENT DOCUMENTS

| | | | |
|---|---|---|---|
| 2004/0095164 A1* | 5/2004 | Kernahan | G11C 27/02 327/94 |
| 2004/0095264 A1* | 5/2004 | Thomas | H03M 5/08 341/53 |
| 2020/0161959 A1* | 5/2020 | Chuang | H02M 1/08 |

* cited by examiner

MULTI-LEVEL SWITCHING POWER CONVERTER, AND CONTROLLER CIRCUIT AND CONTROL METHOD THEREOF

CROSS REFERENCE

The present invention is a continuation-in-part application of U.S. Ser. No. 16/653,940, filed on Oct. 15, 2019, and the present invention claims priority to CN 201811381770.X, filed on Nov. 20, 2018.

BACKGROUND OF THE INVENTION

Field of Invention

The present invention relates to a multi-level switching power converter. Particularly it relates to a multi-level switching power converter which can perform self-balance and self-calibration. The present invention also relates to a controller circuit and a control method for use in the multi-level switching power converter.

Description of Related Art

Relevant prior art documents are "A 50 MHz 5V 3 W 90% Efficiency 3-Level Buck Converter with Real-Time Calibration, Xun Liu et. al, 2016 Symposium on VLSI Circuits Digest of Technical Papers", "Analysis and Design Considerations of Integrated 3-Level Buck Converters, Xun Liu et. al., IEEE TRANSACTIONS ON CIRCUITS AND SYSTEMS Vol. 63, No. 5, May 2016", "A 2 MHz 12-100 V 90% Efficiency Self-Balancing ZVS Reconfigurable Three-Level DC-DC Regulator With Constant-Frequency Adaptive-On-Time V2 Control and Nanosecond-Scale ZVS Turn-On Delay" and "Constant ON-Time 3-Level Buck Converter for Low Power Applications, Brian M. Cassidy et. al, IEEE, 2015", which propose different approaches from the present invention.

FIG. 1 shows a prior art 3-level switching power converter (3-level switching power converter 1) which employs the power switches (N1~N4), the conversion capacitor CF and the inductor L to convert the input power VIN to the output power VOUT by 3-level power conversion. More specifically, the switching node LX is switched among 3 levels of voltages (i.e. the input voltage VVI, the ground level and a proportion voltage level such as VVI/2) to achieve the 3-level power conversion.

The prior art circuit in FIG. 1 has a drawback that the proportion voltage level may shift due to non-ideality or mismatch among circuits to cause extra power loss or un-stability of the switching frequency. FIG. 2 shows operating waveforms of the prior art multi-level switching power converter corresponding to FIG. 1. Ideally, the high level of the voltage of the switching node VLX is supposed to be equal to ½ of the input voltage, i.e. VVI/2, and the average of the voltage VCF across the conversion capacitor CF is also supposed to be equal to VVI/2. However, due to the aforementioned non-ideality, as shown in FIG. 2, the actual high level of the voltage of the switching node VLX is higher than VVI/2 during D1 period, and is lower than VVI/2 during D3 period. On the other hand, the average of the voltage VCF across the conversion capacitor CF is also shifted from the expected VVI/2, to be lower than VVI/2 as shown in FIG. 2. As described earlier, this issue causes extra power loss or un-stability of the switching frequency.

Compared to the prior art in FIG. 1, the present invention is advantageous in that a self-calibration can be performed to keep the level of the voltage of the switching node VLX and the average of the voltage VCF across the conversion capacitor CF at expected levels, whereby the power loss can be reduced and the switching frequency can be kept stable.

SUMMARY OF THE INVENTION

From one perspective, the present invention provides a multi-level switching power converter, comprising: a multi-level power stage circuit, configured to operably convert an input power to an output power by multi-level power conversion; and a controller circuit, configured to operably control the multi-level power stage circuit; wherein the multi-level power stage circuit includes: an inductor, coupled between a switching node and a first node; a conversion capacitor, configured to operably generate at least one proportion voltage level by capacitive voltage division; and plural power switches, coupled to the inductor and the conversion capacitor, and configured to operably control the coupling arrangement of the inductor and the conversion capacitor, such that the switching node is switched among the at least one proportion voltage level, a second node, and a third node, so that the multi-level power conversion is achieved, wherein a voltage across the conversion capacitor determines the at least one proportion voltage level; wherein the first node, the second node and the third node are configured as one of the followings: (1) the first node is coupled to the output power, the second node is coupled to the input power, and the third node is coupled to ground level, whereby the multi-level power stage circuit operates as a buck power stage circuit; (2) the first node is coupled to the input power, the second node is coupled to the output power, and the third node is coupled to the ground level, whereby the multi-level power stage circuit operates as a boost power stage circuit; or, (3) the first node is coupled to the ground level, the second node is coupled to the input power, and the third node is coupled to the output power, whereby the multi-level power stage circuit operates as an inverting buck-boost power stage circuit; wherein the controller circuit includes: a feedback pulse generator circuit, configured to operably generate a trigger pulse according to an output related signal and a reference signal, wherein the output related signal relates to the output power; a phase splitting circuit, configured to operably generate at least a first phase pulse and a second phase pulse according to the trigger pulse; plural timer circuits, coupled to the phase splitting circuit, wherein a first one of the plural timer circuits is configured to operably determine a first time period and generate a first pulse modulation signal according to the first phase pulse and the first time period, and a second one of the plural timer circuits is configured to operably determine a second time period and generate a second pulse modulation signal according to the second phase pulse and the second time period; and an adjusting circuit, configured to operate as one of the followings: (1) the adjusting circuit generating a first adjusting signal according to a difference between the voltage across the conversion capacitor and a reference voltage to control the timer circuit to adjust the first time period such that an average of the voltage across the conversion capacitor is substantially equal to a level of the reference voltage; or (2) the adjusting circuit generating the first adjusting signal according to a difference between a voltage on the switching node and a reference voltage, and a duty ratio related signal, to control the timer circuit to adjust the first time period such that the proportion voltage level is substantially equal to a level of the reference voltage, wherein the duty ratio related signal relates to a duty ratio of the plural power switches.

In one embodiment, the controller circuit further includes another adjusting circuit, configured to operate as one of the followings: (1) the another adjusting circuit generating a second adjusting signal according to the difference between the voltage across the conversion capacitor and the reference voltage to control the second timer circuit to adjust the second time period such that the average of the voltage across the conversion capacitor is substantially equal to the level of the reference voltage; or (2) the another adjusting circuit generating the second adjusting signal according to the difference between the voltage on the switching node and the reference voltage, and the duty ratio related signal, to control the second timer circuit to adjust the second time period such that the proportion voltage level is substantially equal to the level of the reference voltage; wherein a direction of adjusting the second time period by the second adjusting signal is complementary to a direction of adjusting the first time period by the first adjusting signal.

In one embodiment, the timer circuit includes: a current source, configured to operably provide a predetermined current; a timer capacitor circuit, configured to operably generate an integration signal according to a timer current, wherein the timer current relates to the predetermined current; a timer comparison circuit, configured to operably generate a timer comparison signal according to the integration signal and a threshold voltage; and a timer logic circuit, configured to operably generate a timer output signal according to a timer input signal and the integration signal, wherein the timer output signal has a predetermined time period, and a time length of the predetermined time period is determined by the timer circuit according to the timer current, a capacitance of the timer capacitor circuit, and a level of the threshold voltage; wherein the timer input signal of the timer circuit corresponds to the first phase pulse, and the timer output signal corresponds to the first pulse modulation signal, and the predetermined time period corresponds to the first time period.

In one embodiment, the timer circuit adjusts the first time period according to the first adjusting signal by at least one of the following ways: (1) the first adjusting signal adjusting the timer current to adjust the first time period; (2) the first adjusting signal adjusting the threshold voltage to adjust the first time period; or (3) the first adjusting signal adjusting the capacitance of the timer capacitor circuit in an analog or digital manner to adjust the first time period.

In one embodiment, the adjusting circuit includes at least one of the followings: (1) a transconductor circuit, configured to operate as one of the followings: (1a) generating an adjusting output signal according to the difference between the voltage across the conversion capacitor and the reference voltage; or (1b) generating the adjusting output signal according to the difference between the voltage on the switching node and the reference voltage, and the duty ratio related signal, wherein the adjusting output signal is in current form and provides a current branch shunted to the current source and the timer capacitor circuit to adjust the timer current; or (2) a voltage gain circuit, configured to operate as one of the followings: (2a) generating the adjusting output signal according to the difference between the voltage across the conversion capacitor and the reference voltage; or (2b) generating the adjusting output signal according to the difference between the voltage on the switching node and the reference voltage, and the duty ratio related signal, wherein the adjusting output signal is in voltage form and is configured to adjust the threshold voltage; wherein the adjusting output signal corresponds to the first adjusting signal.

In one embodiment, the first pulse modulation signal and the second pulse modulation signal control the plural power switches such that the power stage circuit operates in one of the following states: (1) a first state: the inductor and the conversion capacitor being electrically connected in series between the second node and the first node, wherein one terminal of the conversion capacitor is electrically connected to the switching node, and the other terminal of the conversion capacitor is electrically connected to the second node; (2) a second state: the inductor being electrically connected between the third node and the first node; (3) a third state: the inductor and the conversion capacitor being electrically connected in series between the third node and the first node, wherein the terminal of the conversion capacitor is electrically connected to the third node, and the other terminal of the conversion capacitor is electrically connected to the switching node; or (4) a fourth state: the inductor being electrically connected between the second node and the first node; wherein the first pulse modulation signal controls the power stage circuit to operate in the first state in the first time period, and the second pulse modulation signal controls the power stage circuit to operate in the third state in the second time period; or the first pulse modulation signal controls the power stage circuit to operate in the fourth state outside the first time period, and the second pulse modulation signal controls the power stage circuit to operate in the second state outside the second time period.

In one embodiment, when the multi-level power stage circuit operates as the buck power stage circuit, the switching node is switched between the output power and the proportion voltage level, or the switching node is switched between the ground level and the proportion voltage level, wherein a level of the reference voltage is ½ of an input voltage of the input power; or when the multi-level power stage circuit operates as the boost power stage circuit, the switching node is switched between the output power and the proportion voltage level, or the switching node is switched between the ground level and the proportion voltage level, wherein the level of the reference voltage is ½ of an output voltage of the output power; or when the multi-level power stage circuit operates as the inverting buck-boost power stage circuit, the switching node is switched between the output power and the proportion voltage level, or the switching node is switched between the input power and the proportion voltage level, wherein the level of the reference voltage is ½ of a difference between the input voltage and the output voltage.

In one embodiment, the feedback pulse generator circuit includes: an error amplifier circuit, configured to operably generate an error amplified signal according to the difference between the output related signal and the reference signal; and a modulation comparison circuit, configured to operably compare the error amplified signal and a ramp signal to generate the trigger pulse.

From another perspective, the present invention provides a controller circuit for use in controlling a multi-level switching power converter to convert an input power to an output power by multi-level power conversion, the multi-level power converter including: an inductor, coupled between a switching node and a first node; a conversion capacitor, configured to operably generate at least one proportion voltage level by capacitive voltage division; and plural power switches, coupled to the inductor and the conversion capacitor, and configured to operably control the coupling arrangement of the inductor and the conversion capacitor, such that the switching node is switched among the at least one proportion voltage level, a second node, and a third node so that the multi-level power conversion is achieved, wherein a voltage across the conversion capacitor determines the at least one proportion voltage level; wherein the first node, the second node and the third node are configured as one of the followings: (1) the first node is coupled to the output power, the second node is coupled to the input power, and the third node is coupled to ground level, whereby the multi-level power stage circuit operates as a buck power stage circuit; (2) the first node is coupled to the input power, the second node is coupled to the output power, and the third node is coupled to the ground level, whereby the multi-level power stage circuit operates as a boost power stage circuit; or, (3) the first node is coupled to the ground level, the second node is coupled to the input power, and the third node is coupled to the output power, whereby the multi-level power stage circuit operates as an inverting buck-boost power stage circuit; the controller circuit comprising: a feedback pulse generator circuit, configured to operably generate a trigger pulse according to an output related signal and a reference signal, wherein the output related signal relates to the output power; a phase splitting circuit, configured to operably generate at least a first phase pulse and a second phase pulse according to the trigger pulse; plural timer circuits, coupled to the phase splitting circuit, wherein a first one of the plural timer circuits is configured to operably determine a first time period and generate a first pulse modulation signal according to the first phase pulse and the first time period, and a second one of the plural timer circuits is configured to operably determine a second time period and generate a second pulse modulation signal according to the second phase pulse and the second time period; and an adjusting circuit, configured to operate as one of the followings: (1) the adjusting circuit generating a first adjusting signal according to a difference between the voltage across the conversion capacitor and a reference voltage to control the timer circuit to adjust the first time period such that an average of the voltage across the conversion capacitor is substantially equal to a level of the reference voltage; or (2) the adjusting circuit generating the first adjusting signal according to a difference between a voltage on the switching node and a reference voltage, and a duty ratio related signal, to control the timer circuit to adjust the first time period such that the proportion voltage level is substantially equal to a level of the reference voltage, wherein the duty ratio related signal relates to a duty ratio of the plural power switches.

From another perspective, the present invention provides a control method for controlling a multi-level switching power converter to convert an input power to an output power by multi-level power conversion, wherein the multi-level power converter includes: an inductor, coupled between a switching node and a first node; a conversion capacitor, configured to operably generate at least one proportion voltage level by capacitive voltage division; and plural power switches, coupled to the inductor and the conversion capacitor, and configured to operably control the coupling arrangement of the inductor and the conversion capacitor, such that the switching node is switched among the at least one proportion voltage level, a second node, and a third node, so that the multi-level power conversion is achieved, wherein a voltage across the conversion capacitor determines the at least one proportion voltage level; wherein the first node, the second node and the third node are configured as one of the followings: (1) the first node is coupled to the output power, the second node is coupled to the input power, and the third node is coupled to ground level, whereby the multi-level power stage circuit operates as a buck power stage circuit; (2) the first node is coupled to the input power, the second node is coupled to the output power, and the third node is coupled to the ground level, whereby the multi-level power stage circuit operates as a boost power stage circuit; or, (3) the first node is coupled to the ground level, the second node is coupled to the input power, and the third node is coupled to the output power, whereby the multi-level power stage circuit operates as an inverting buck-boost power stage circuit; the control method comprising: generating a trigger pulse according to an output related signal and a reference signal, wherein the output related signal relates to the output power; generating at least a first phase pulse and a second phase pulse according to the trigger pulse; determining a first time period and generating a first pulse modulation signal according to the first phase pulse and the first time period; determining a second time period and generating a second pulse modulation signal according to the second phase pulse and the second time period; and performing one of the followings: adjusting the first time period according to a difference between the voltage across the conversion capacitor and a reference voltage such that an average of the voltage across the conversion capacitor is substantially equal to a level of the reference voltage; or adjusting the first time period according to a difference between a voltage on the switching node and a reference voltage, and a duty ratio related signal, such that the proportion voltage level is substantially equal to a level of the reference voltage, wherein the duty ratio related signal relates to a duty ratio of the plural power switches.

In one embodiment, the control method further comprises one of the followings: (1) adjusting the second time period according to the difference between the voltage across the conversion capacitor and the reference voltage such that the average of the voltage across the conversion capacitor is substantially equal to the level of the reference voltage; or (2) adjusting the second time period according to the difference between the voltage on the switching node and the reference voltage, and the duty ratio related signal, such that the proportion voltage level is substantially equal to the level of the reference voltage; wherein a direction of adjusting the second time period by the second adjusting signal is complementary to a direction of adjusting the first time period by the first adjusting signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
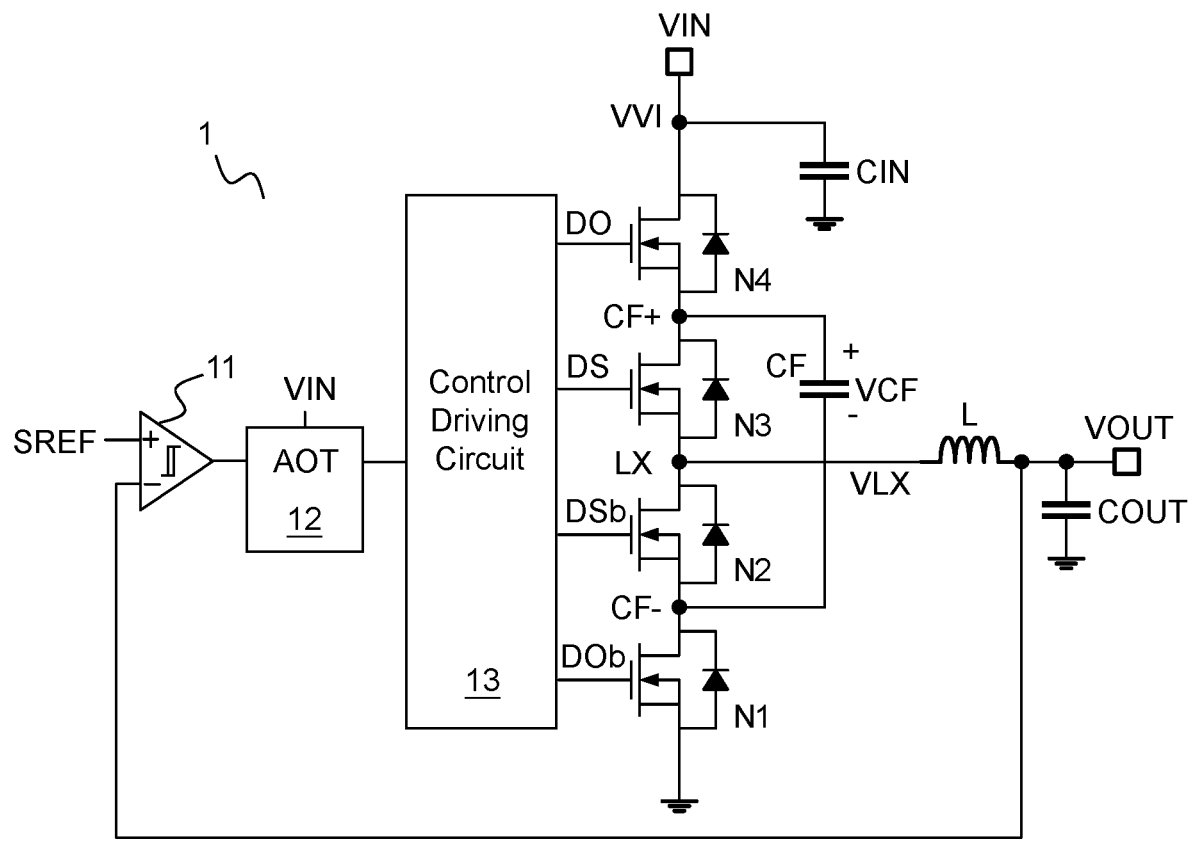
FIG. 1 shows a schematic diagram of a prior art multi-level switching power converter.
Figure 2:
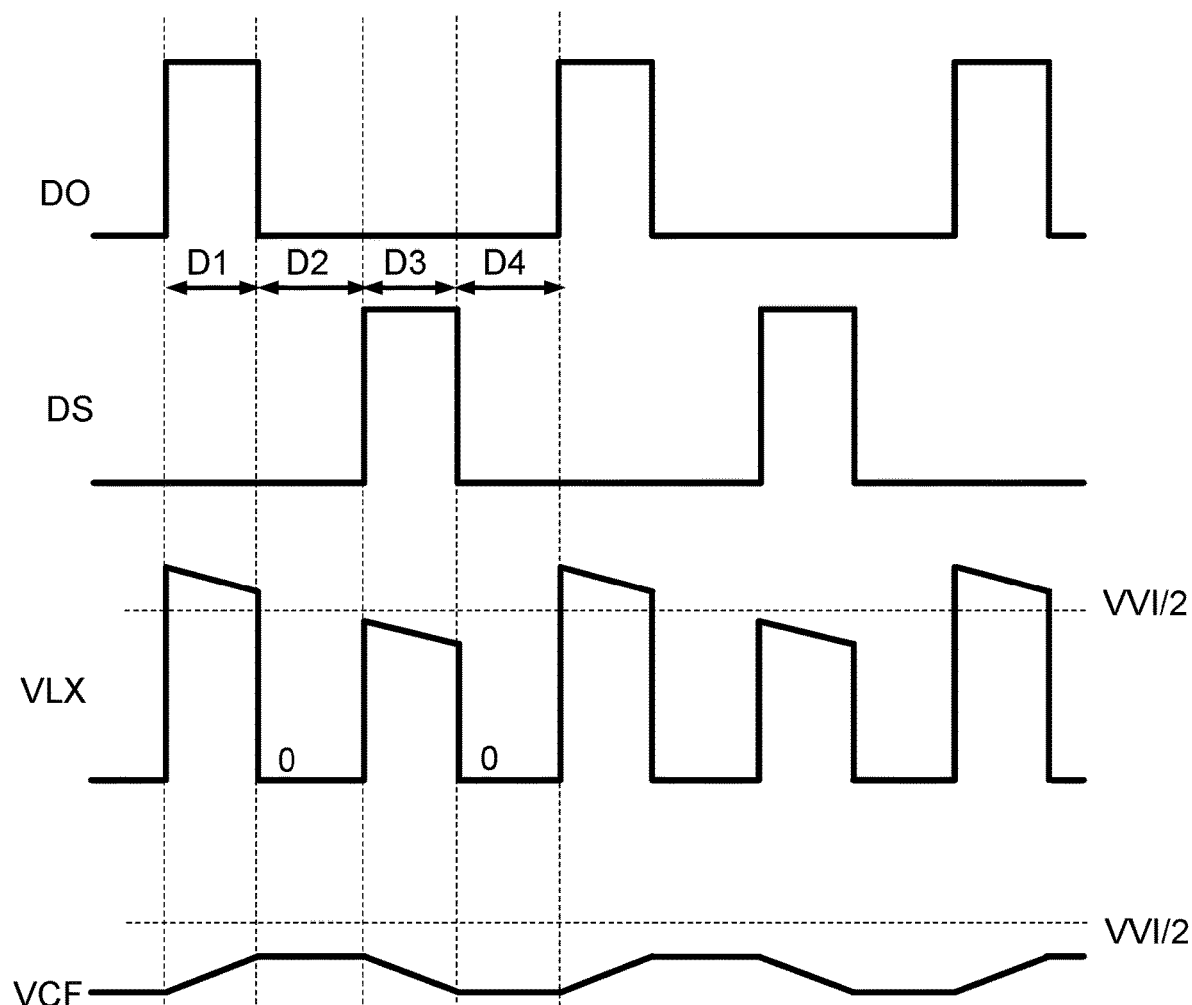
FIG. 2 shows operating waveforms of a prior art multi-level switching power converter.
Figure 3A:
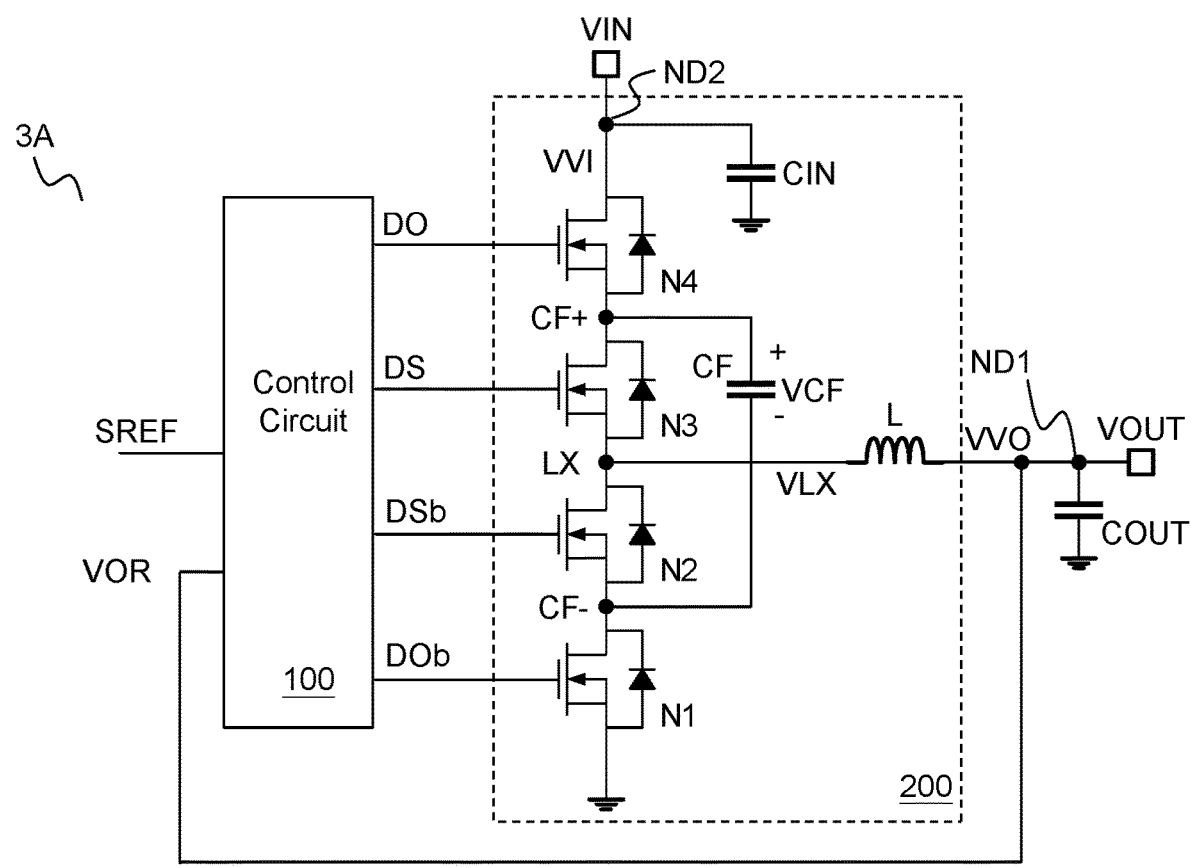
FIGS. 3A-3D show schematic diagrams of various embodiments of the multi-level switching power converter according to the present invention.
Figure 3B:
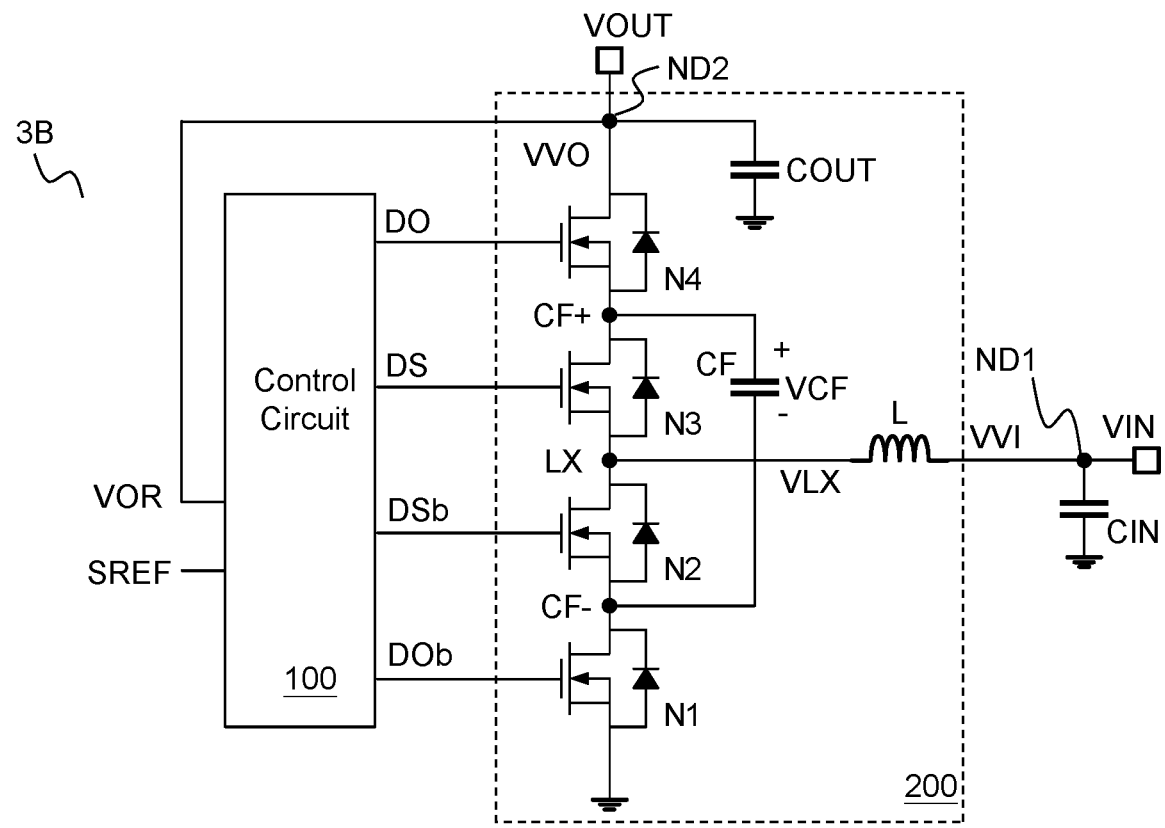
Figure 3C:
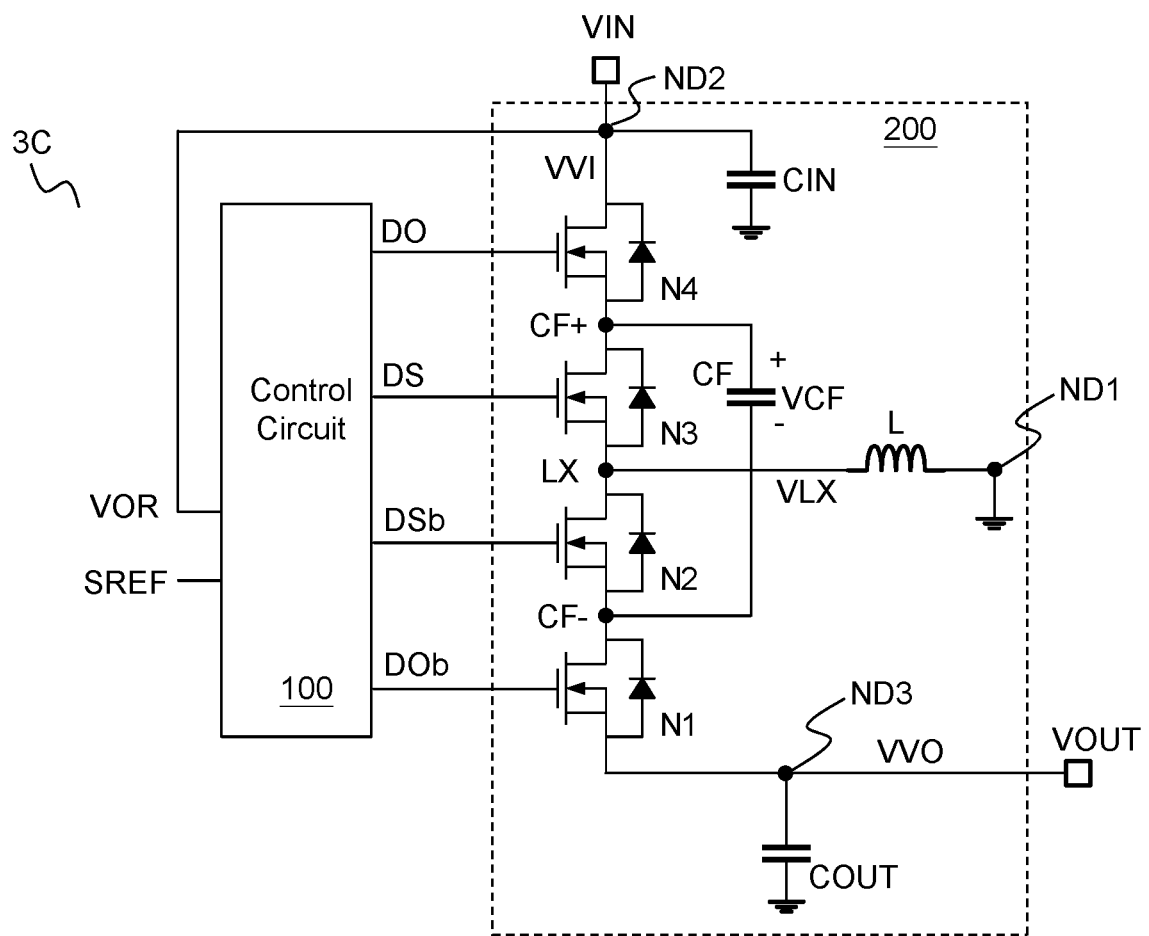

FIGS. 3A-3C show schematic diagrams of three embodiments of the multi-level switching power converter (multi-level switching power converter 3A-3C) according to the present invention. As shown in FIGS. 3A-3C, each of the multi-level switching power converter (multi-level switching power converter 3A-3C) comprises a multi-level power stage circuit 200 and a controller circuit 100. The multi-level power stage circuit 200 is configured to operably convert an input power VIN to an output power VOUT by multi-level power conversion. The controller circuit 100 is configured to operably control the multi-level power stage circuit 200.

Still referring to FIGS. 3A-3C, the multi-level power stage circuit 200 includes an inductor L, at least one conversion capacitor (e.g. CF) and plural power switches (e.g. N1~N4). The inductor L is coupled between a switching node LX and a first node ND1. The conversion capacitor CF is configured to operably generate at least one proportion voltage level by capacitive voltage division ("Capacitive voltage division" will be explained in detail later).

The plural power switches (N1~N4) are coupled to the inductor L and the conversion capacitor CF, and are configured to operably control the coupling arrangement of the inductor L and the conversion capacitor CF, such that the switching node LX is switched among the at least one proportion voltage level, a second node ND2, and a third node ND3, to achieve the multi-level power conversion, wherein the voltage VCF across the conversion capacitor CF determines the at least one proportion voltage level.

In one embodiment, as shown in FIG. 3A, the first node ND1 is coupled to the output power VOUT, the second node ND2 is coupled to the input power VIN, and the third node ND3 is coupled to the ground level. In this case, the multi-level switching power converter 3A is configured to be a buck (step-down) multi-level switching power converter, and the multi-level power stage circuit 200 is configured to be a buck power stage circuit. In another embodiment, as shown in FIG. 3B, the first node ND1 is coupled to the input power VIN, the second node ND2 is coupled to the output power VOUT, and the third node ND3 is coupled to the ground level. In this case, the multi-level switching power converter 3B is configured to be a boost (step-up) multi-level switching power converter, and the multi-level power stage circuit 200 is configured to be a boost power stage circuit. In another embodiment, as shown in FIG. 3C, the first node ND1 is coupled to the ground level, the second node ND2 is coupled to the input power VIN, and the third node ND3 is coupled to the output power VOUT. In this case, the multi-level switching power converter 3B is configured to be an inverting buck-boost multi-level switching power converter, and the multi-level power stage circuit 200 is configured to be an inverting buck-boost power stage circuit. Note that when the multi-level power stage circuit 200 is configured to be an inverting buck-boost power stage circuit, the output voltage VVO and the input voltage VVI have opposite signs (+/−), and the ratio of the absolute value of the output voltage VVO over the absolute value of the input voltage VVI can be larger than, equal to, or smaller than 1. The input capacitor CIN and the output capacitor COUT are coupled to the input power VIN and the output power VOUT respectively.

The term "multi-level" used in the terms "multi-level switching power converter" and "multi-level power stage circuit" indicates that the switching node LX is switched among multiple levels, such as the aforementioned at least one proportion voltage level, the second node ND2 and the third node ND3, so as to convert the input power VIN to the output power VOUT, whereby the multi-level power conversion is achieved. More specifically, the multi-level switching power converters 3A-3C shown in FIGS. 3A-3C are 3-level switching power converters (corresponding to buck, boost, and inverting buck-boost types respectively).

Hereinafter for simplicity, the multi-level switching power converter of the present invention will be illustrated and explained using a buck type power converter (more specifically a 3-level buck type switching power converter) as an example, unless noted.

Figure 4A:
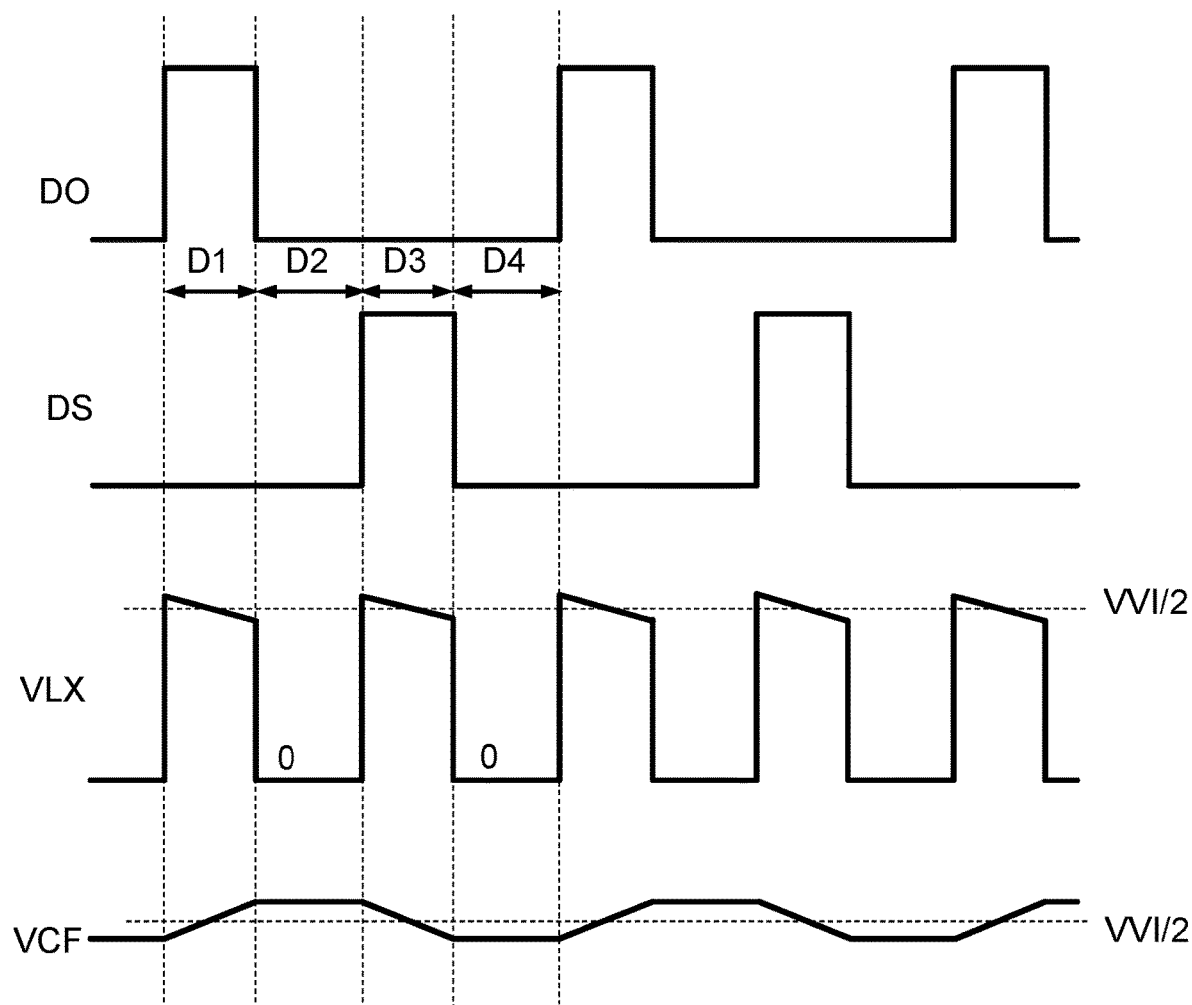
FIGS. 4A-4B show operating waveforms corresponding to the embodiment shown in FIG. 3A.
Figure 4B:
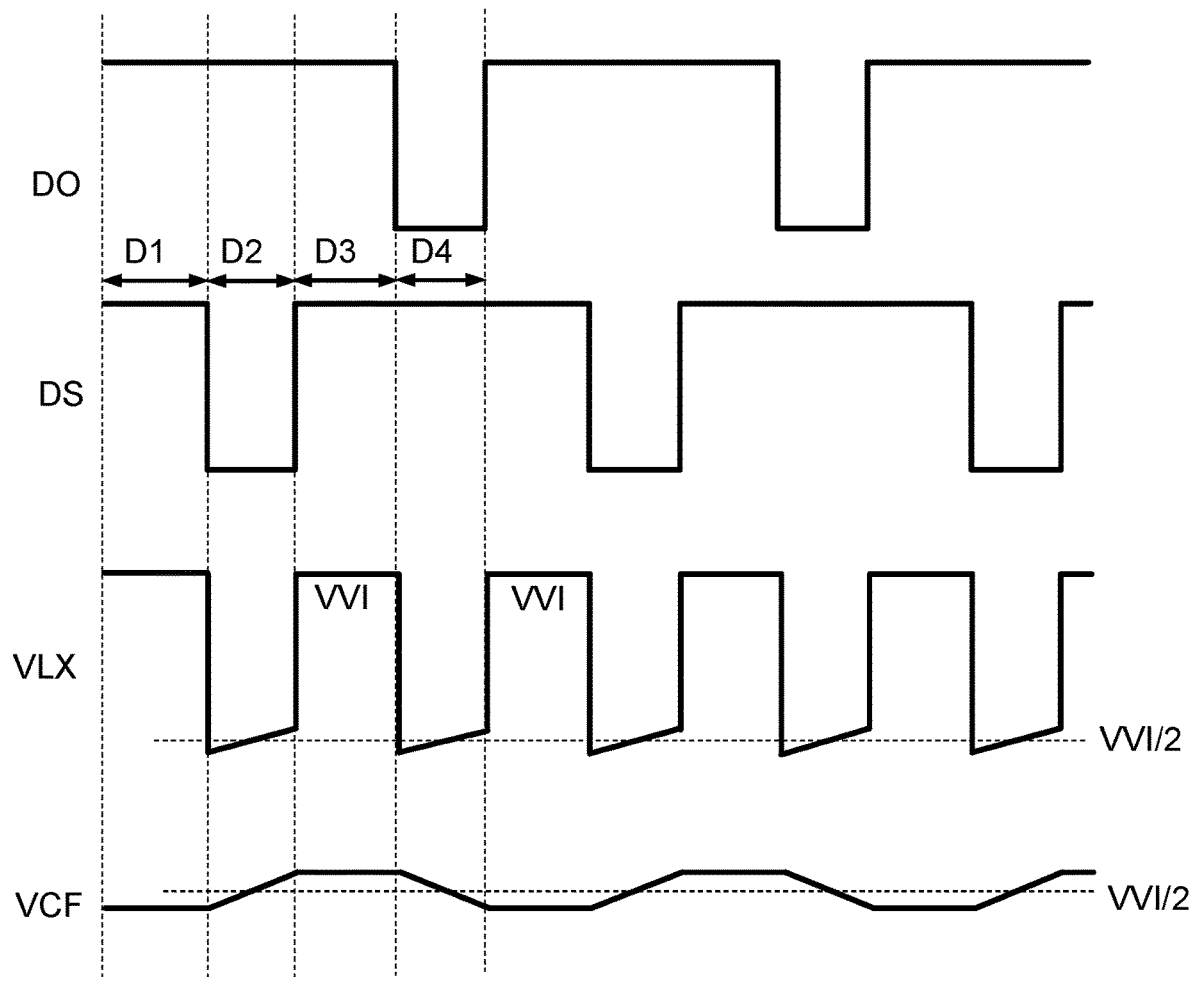

FIGS. 4A-4B show operating waveforms corresponding to the embodiment shown in FIG. 3A.

As shown in FIG. 4A, in this embodiment, the input power has an input voltage VVI and the output power VOUT has an output voltage VVO. When the duty ratio of the input voltage to the output voltage (i.e. VVO/VVI) is less than 50%, the voltage VLX on the switching node LX is switched between the ground level (corresponding to the third node ND3) and the target value of the proportion voltage level (VVI/2). As shown in FIG. 4B, in this embodiment, when the duty ratio of the input voltage to the output voltage (i.e. VVO/VVI) is larger than 50%, the voltage VLX on the switching node LX is switched between the input voltage VVI and the target value of the proportion voltage level (VVI/2). In this embodiment, the level of the proportion voltage level is ½ of the input voltage VVI, i.e. VVI/2.

As shown in FIG. 3B, when the first node ND1 is coupled to the input power VIN and the second node ND2 is coupled to the output power VOUT, the switching node LX is switched between the output power VOUT and the proportion voltage level, or the switching node LX is switched between the ground level (corresponding to the third node ND3) and the proportion voltage level. In this embodiment, the proportion voltage level is ½ of the output voltage VVO of the output power VOUT, i.e. VVO/2. As shown in FIG. 3C, when the first node ND1 is coupled to the ground level and the second node ND2 is coupled to the input power VIN, the switching node LX is switched between the output power VOUT and the proportion voltage level, or the switching node LX is switched between the input power VIN and the proportion voltage level. In this embodiment, the proportion voltage level is ½ of a difference between the input voltage VVI and the output voltage VVO, i.e. (VVI−VVO)/2.

Figure 5:
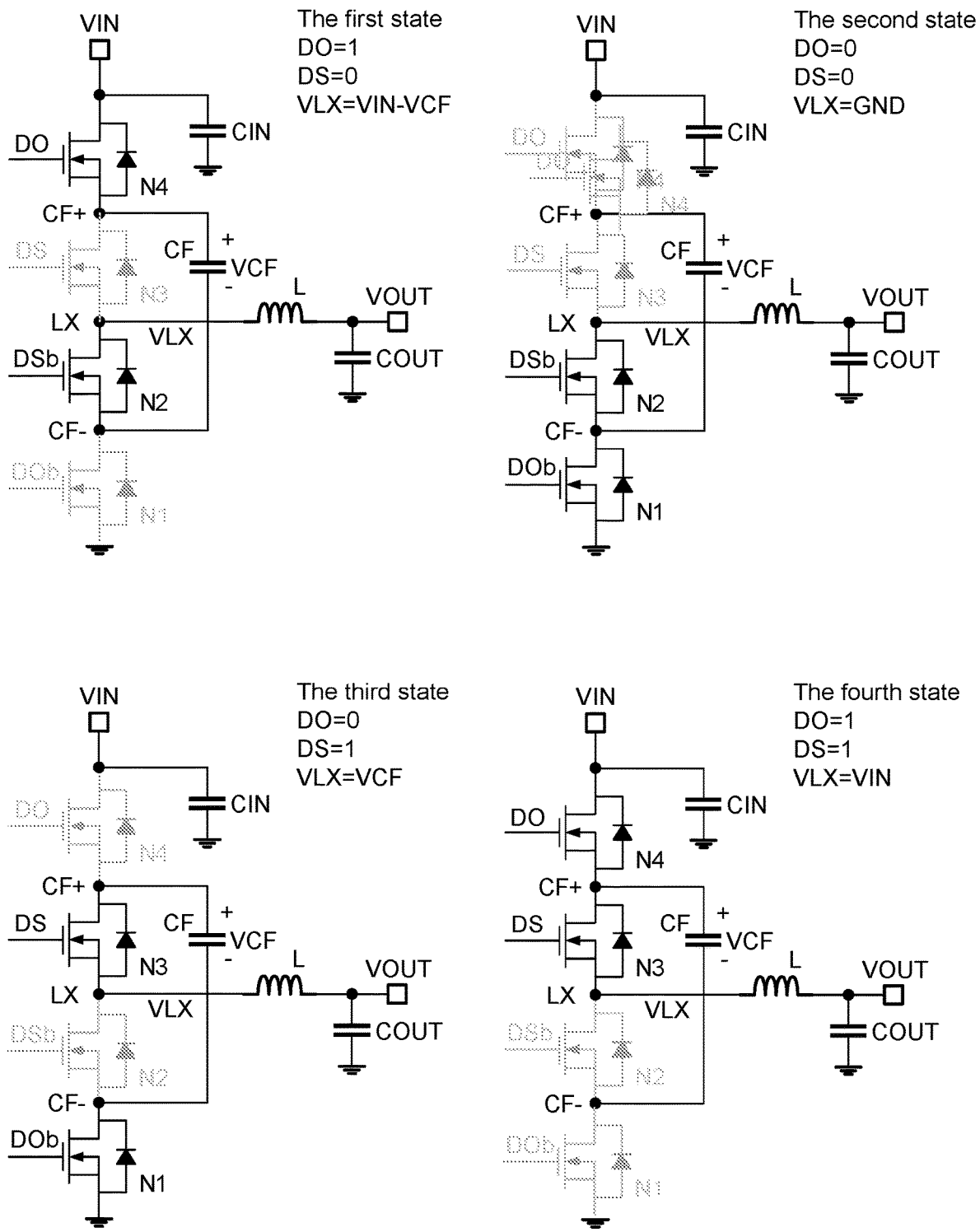
FIG. 5 shows schematic diagrams of four coupling states corresponding to the embodiment shown in 3A.

FIG. 5 shows schematic diagrams of four coupling states corresponding to the embodiment shown in 3A. Referring to FIGS. 3A and 5, the aforementioned "capacitive voltage division" means that the conversion capacitor CF is controlled to be coupled between the second node ND2 and the switching node LX (e.g. the first state as shown in FIG. 5), or to be coupled between the switching node LX and the ground voltage level (e.g. the third state as shown in FIG. 5), in a time-shared manner, thereby generating the at least one proportion voltage level (e.g. VVI/2) by the "capacitive voltage division". In other words, the voltage VCF across the conversion capacitor CF determines the at least one proportion voltage level. In the embodiments shown in FIGS. 3A, 4A and 4B, the target level of the voltage VCF across the conversion capacitor CF is VVI/2. In these embodiments, the proportion voltage level also is VVI/2.

From another perspective, the multi-level switching power conversion achieved by the "capacitive voltage division" is characterized in that: during some of the time periods, the plural power switches control the inductor L and the conversion capacitor CF to be electrically connected in series between the first node ND1 and the second node ND2 (e.g. the first state shown in FIG. 5), while during other time periods, the plural power switches control the inductor L and the conversion capacitor CF to be electrically connected in series between the first node ND1 and the ground level (e.g. the third state shown in FIG. 5), such that the switching node LX is switched among the at least one proportion voltage level (e.g. VVI/2), the ground level (corresponding to the third node ND3), and the second node ND2, so that the multi-level power conversion is achieved, wherein the voltage VCF across the conversion capacitor CF determines the at least one proportion voltage level.

Note that, in a boost type multi-level switching power converter (e.g. FIG. 3B), the "capacitive voltage division" is scaling-up; more specifically, the proportion voltage level is pumped to the voltage on the second node ND2 (e.g. corresponding to VVO as shown in FIG. 3B). That is, in the context of the present invention, "capacitive voltage division" can be scaling down (e.g. VVI/2) or scaling up (e.g. VVO) the proportion voltage level.

Figure 3D:
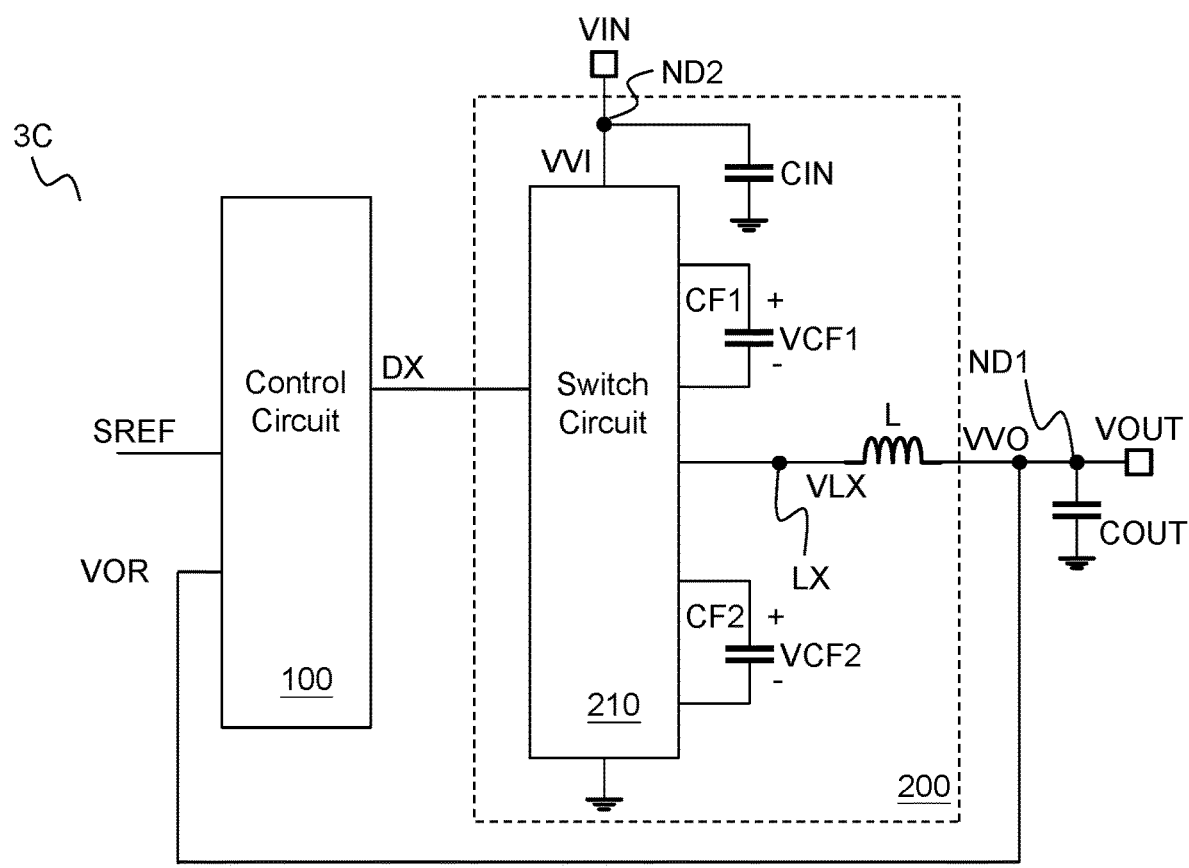

According to the present invention, the multi-level switching power conversion achieved by the "capacitive voltage division" is not limited to the 3-level switching power conversion as illustrated in FIGS. 3A, 4A and 4B. In other embodiments, the multi-level switching power conversion achieved by the "capacitive voltage division" can be expanded to include more than 3 levels. For example, as shown in FIG. 3D, in one embodiment, the switching node LX (coupled to a terminal of the inductor L) can be switched among the second node (e.g. corresponding to the input voltage VIN), the ground level (corresponding to the third node ND3), a first proportion voltage level (e.g. VVI*(⅔)) and a second proportion voltage level (e.g. VVI*(⅓)), thereby achieving 4-level switching power conversion. More specifically, the power stage circuit 200 can be configured to include plural conversion capacitors (e.g. CF1 and CF2) for achieving 4-level "capacitive voltage division". The controller circuit 100 generates a pulse modulation signal DX (which can include plural corresponding pulse modulation signals) to control the switch circuit 210. The switch circuit 210 includes the aforementioned plural power switches which are configured to perform the aforementioned switching. In this embodiment, the voltage VCF1 across the conversion capacitor CF1 and the voltage VCF2 across the conversion capacitor CF2 determine the first proportion voltage level and the second proportion voltage level by the capacitive voltage division.

In one specific embodiment, as shown in FIG. 3A, the plural power switches includes a first power switch N1, a second power switch N2, a third power switch N3, and the fourth power switch N4. One terminal of the fourth power switch N4 and one terminal of the third power switch N3 are coupled to a upper node CF+. Another terminal of the fourth power switch N4 is coupled to the second node ND2. Another terminal of the third power switch N3 is coupled to the switching node LX. One terminal of the second power switch N2 and one terminal of the first power switch N1 are coupled to a lower node CF−. Another terminal of the second power switch N2 is coupled to the switching node LX. Another terminal of the first power switch N1 is coupled to the ground level (corresponding to the third node ND3). In this embodiment, the conversion capacitor CF is couple between the upper node CF+ and the lower node CF−. The inductor L is coupled between the switching node LX and the first node ND1. In this embodiment, the fourth power switch N4 and the first power switch N1 are configured to switch complementarily (e.g. controlled by the complementary driving signals DO and DOb). The third power switch N3 and the second power switch N2 are configured to switch complementarily (e.g. controlled by the complementary driving signals DS and DSb). As described earlier, this embodiment can achieve 3-level switching power conversion. The conversion capacitor CF provides the capacitive voltage division function.

The configuration of the power stage circuit 200 shown in FIG. 3B or 3C is similar to the embodiment shown in FIG. 3A, so its details are not redundantly explained for simplicity.

Figure 6A:
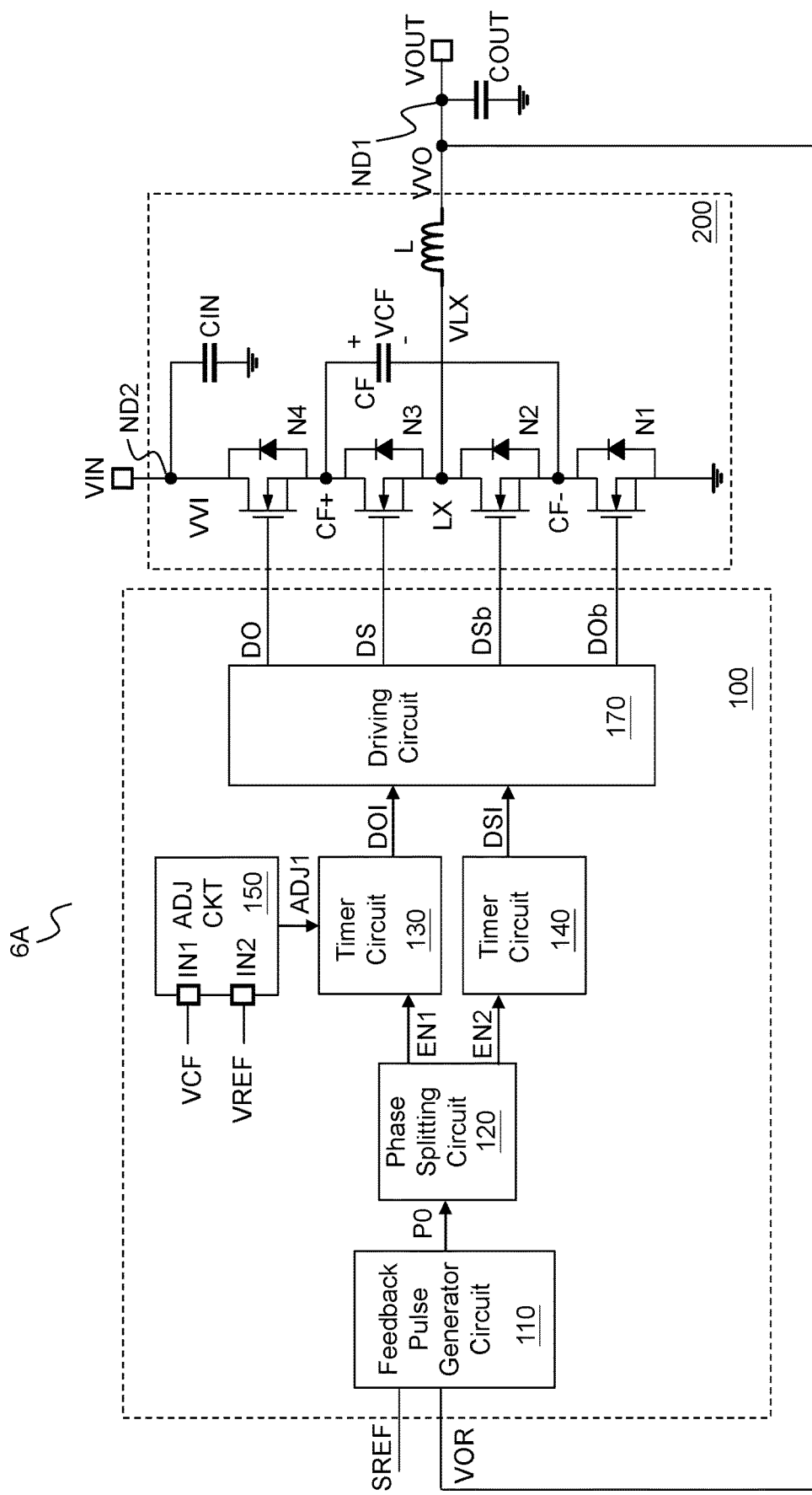
FIGS. 6A-6B show schematic diagrams of two specific embodiments of the multi-level switching power converter according to the present invention.

FIG. 6A shows a schematic diagram of one specific embodiment of the multi-level switching power converter (multi-level switching power converter 6A) according to the present invention. In this embodiment, the controller circuit 100 includes a feedback pulse generator circuit 110, a phase splitting circuit 120, plural timer circuits (e.g. 130 and 140), and an adjusting circuit (ADJ CKT) 150.

Figure 8:
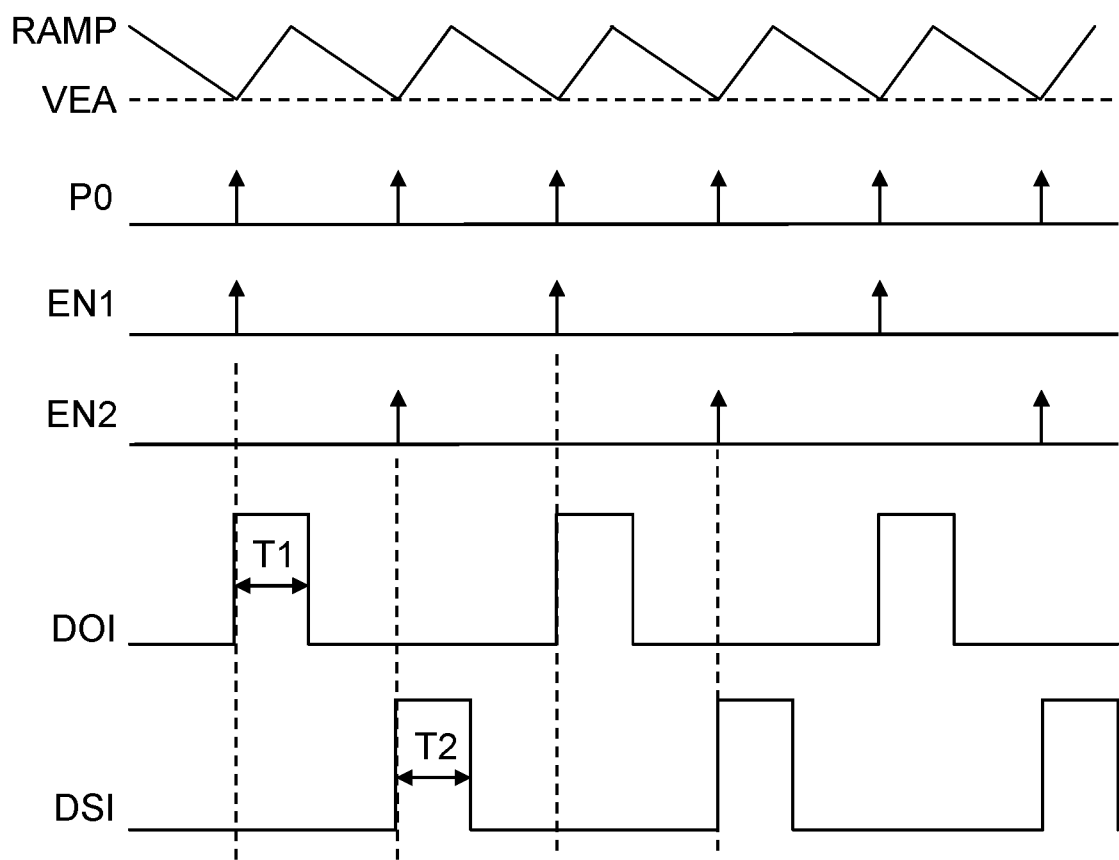
FIG. 8 shows operating waveforms of the multi-level switching power converter according to the present invention.

FIG. 8 shows operating waveforms of the multi-level switching power converter according to the present invention (e.g. corresponding to FIG. 6A). The feedback pulse generator circuit 110 is configured to operably generate a trigger pulse P0 according to an output related signal VOR and a reference signal SREF, wherein the output related signal VOR relates to the output power VOUT. In one embodiment, the output related signal VOR can be directly coupled to the output power VOUT as shown in FIG. 6A. In other embodiments, the output related signal VOR can be a voltage division of the output power VOUT or other types of signals related to the output power VOUT.

Figure 7:
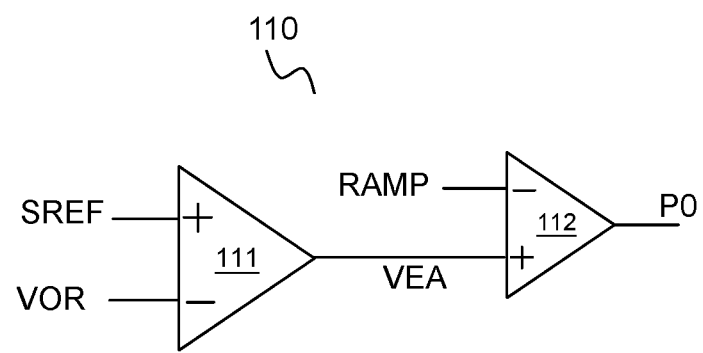
FIG. 7 shows a schematic diagram of a specific embodiment of the feedback pulse generator circuit of the multi-level switching power converter according to the present invention.

FIG. 7 shows a schematic diagram of a specific embodiment of the feedback pulse generator circuit of the multi-level switching power converter according to the present invention (feedback pulse generator circuit 110). As shown in FIG. 7, the feedback pulse generator circuit 110 includes an error amplifier circuit 111 and a modulation comparison circuit 112. The error amplifier circuit 111 is configured to operably generate an error amplified signal VEA according to the difference between the output related signal VOR and the reference signal SREF. The modulation comparison circuit 112 is configured to operably compare the error amplified signal VEA with a ramp signal RAMP to generate the trigger pulse P0. In one embodiment, the ramp signal RAMP relates to the inductor current of the inductor L. In other embodiments, the ramp signal RAMP can be generated independently, i.e. not related to the inductor current of the inductor L.

In other embodiments, the feedback pulse generator circuit can be embodied to compare the output power with a reference signal by a feedback comparator to generate the trigger pulse.

Still referring to FIG. 6A, the phase splitting circuit 120 is configured to operably generate at least a first phase pulse EN1 and a second phase pulse EN2 according to the trigger pulse P0.

The plural timer circuits are coupled to the phase splitting circuit 120. One of the plural timer circuits (e.g. 130) is configured to operably determine a first time period T1 and generate a first pulse modulation signal DOI according to the first phase pulse EN1 and the first time period T1, and another of the plural timer circuits (e.g. 140) is configured to operably determine a second time period T2 and generate a second pulse modulation signal DSI according to the second phase pulse EN2 and the second time period T2. The first pulse modulation signal DOI and the second pulse modulation signal DSI control the plural power switches (N1~N4) to achieve the multi-level switching power conversion.

Still referring to FIG. 6A, in one embodiment, the first pulse modulation signal DOI controls the fourth power switch N4 and the first power switch N1, and the second pulse modulation signal DSI controls the third power switch N3 and the second power switch N2. In one embodiment, the controller circuit 100 further includes a driving circuit 170. The driving circuit 170 is configured to operably generate the driving signals DO and DOb for directly driving the fourth power switch N4 and the first power switch N1 according to the first pulse modulation signal DOI, and generate the driving signals DS and DSb for directly driving the third power switch N3 and the second power switch N2 according to the second pulse modulation signal DSI. In one embodiment, the driving signals DO and DOI are in-phase to each other. In one embodiment, the driving signals DO and DOI have different voltage levels. In one embodiment, the driving signals DO and DOb are inverse to each other. Similarly, In one embodiment, the driving signals DS and DSI are in-phase to each other. In one embodiment, the driving signals DS and DSI have different voltage levels. In one embodiment, the driving signals DS and DSb are inverse to each other.

Figure 6B:
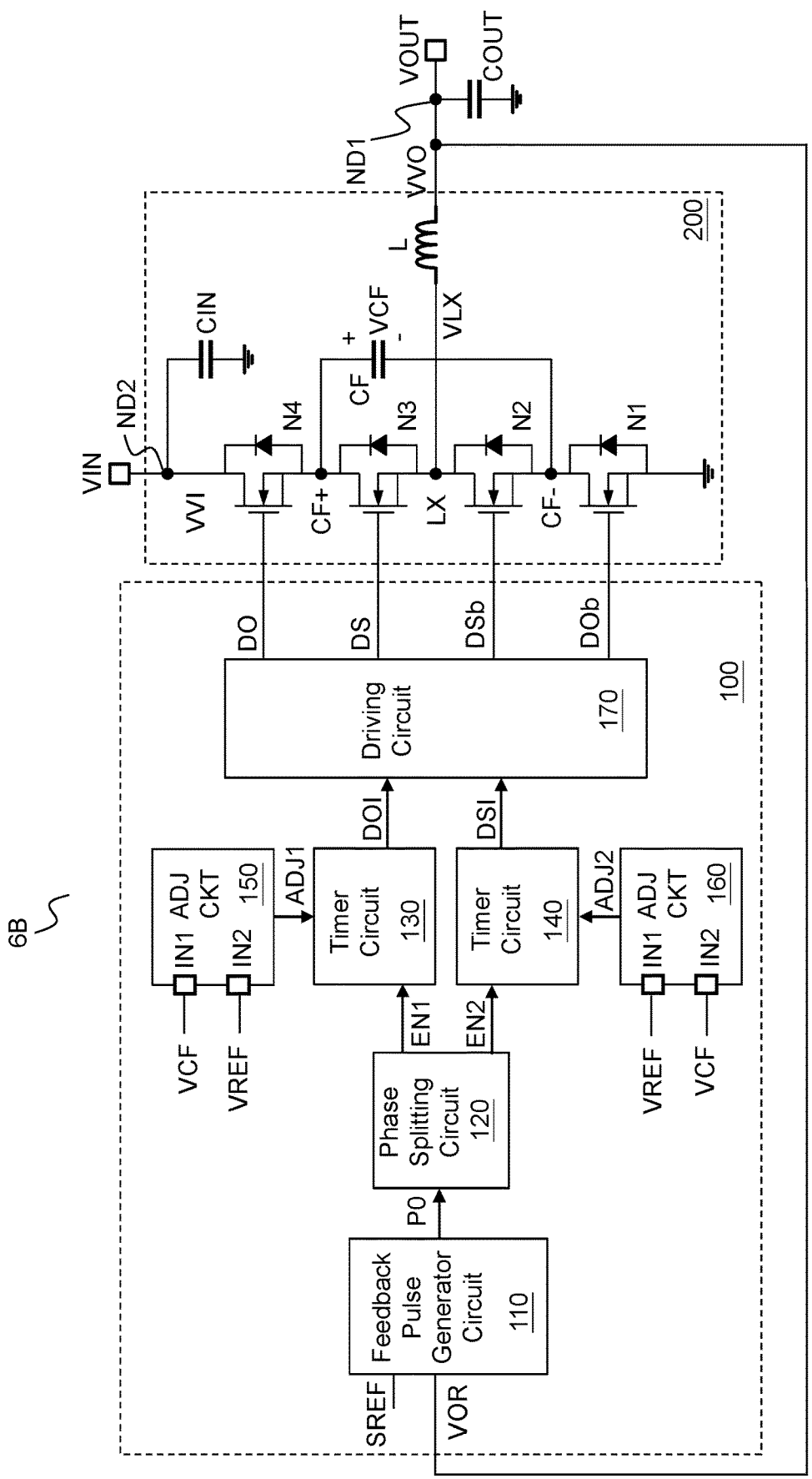

Still referring to FIGS. 4A-4B, 5 and 6A-6B, in the embodiments shown in FIGS. 6A-6B, the controller circuit 100 is configured to generate the first pulse modulation signal DOI and the second pulse modulation signal DSI to control the plural power switches (N1~N4) so as to switch the coupling arrangement of the conversion capacitor CF and the inductor L to one of the following states (referring to FIG. 5), thereby achieving the multi-level switching power conversion (3-level in this embodiment):

(1) a first state: the inductor L and the conversion capacitor CF being electrically connected in series between the second node ND2 and the first node ND1, wherein one terminal of the conversion capacitor CF is electrically connected to the switching node LX, and the other terminal of the conversion capacitor CF is electrically connected to the second node ND2;

(2) a second state: the inductor L being electrically connected between the ground level (corresponding to the third node ND3) and the first node ND1;

(3) a third state: the inductor L and the conversion capacitor CF being electrically connected in series between the ground level (corresponding to the third node ND3) and the first node ND1, one terminal of the conversion capacitor CF is electrically connected to the ground level (corresponding to the third node ND3), and the other terminal of the conversion capacitor CF is electrically connected to the switching node LX; or (4) a fourth state: the inductor L being electrically connected between the second node ND2 and the first node ND1. Note that, in this embodiment as shown in the figure, the conversion capacitor CF is floating in the second and the fourth states, but this is not the only option and the conversion capacitor CF can be arranged in other ways.

As shown in FIGS. 4A-4B, the first pulse modulation signal DOI controls the power stage circuit 200 to operate in the first state in the first time period T1, and the second pulse modulation signal DSI controls the power stage circuit 200 to operate in the third state in the second time period T2; or the first pulse modulation signal DOI controls the power stage circuit 200 to operate in the fourth state outside the first time period T1, and the second pulse modulation signal DSI controls the power stage circuit 200 to operate in the second state outside the second time period T2. Note that, as shown in FIGS. 4A-4B, D1-D4 represent time periods within one switching cycle, which correspond the first to the fourth states and relate to the aforementioned duty ratio.

More specifically, as shown in FIG. 8, in this embodiment, when the ramp signal RAMP and the error amplified signal VEA intersect, a trigger pulse P0 is generated. Next, the phase splitting circuit 120 splits the trigger pulses P0 into two phases, i.e. the first phase pulse EN1 and the second phase pulse EN2. The timer circuit 130 generates the first pulse modulation signal DOI according to the first phase pulse EN1. As shown in FIG. 8, in this embodiment, the first pulse modulation signal DOI includes an enable period having a time length of the first time period T1. (In this embodiment, "enable" is represented by a high level, which is for illustrating purpose only but not for limiting the scope of the present invention.) The timer circuit 140 generates the second pulse modulation signal DSI according to the second phase pulse EN2. As shown in FIG. 8, in this embodiment, the second pulse modulation signal DSI includes an enable period having a time length of the second time period T2.

Note that, in one embodiment, the aforementioned enable period during the first time period T1 or the second time period T2 correspond to an ON time of one of the plural power switches. In other embodiments, the aforementioned enable period during the first time period T1 or the second time period T2 correspond to an OFF time of one of the plural power switches. Besides, the time length of the first time period T1 or the second time period T2 can be a fixed value, or an adjustable variable. For example, in one embodiment, the time length of the first time period T1 or the second time period T2 can be adaptively adjusted according to the relationship between the input voltage VVI and the output voltage VVO, such that the switching frequency of the multi-level switching power converter is substantially fixed. In other embodiments, according to the present invention, the first time period T1 or the second time period T2 can be adaptively adjusted to solve the issue of the shift of the proportion voltage level as describe earlier; the details thereof will be explained later.

Still referring to FIG. 6A, the adjusting circuit 150 generates a first adjusting signal ADJ1 according to a difference between the voltage VCF across the conversion capacitor CF and a reference voltage VREF to control the timer circuit 130 to adjust the first time period T1 such that an average of the voltage VCF across the conversion capacitor CF is substantially equal to the level of the reference voltage VREF.

In one embodiment, the level of the reference voltage can be configured to be the expected average level of the voltage VCF of the conversion capacitor CF. For example, in the embodiment of the multi-level switching power converter shown FIG. 6A (i.e. 3-level, buck), the expected average level of the voltage VCF of the conversion capacitor CF is ½ of the input voltage VVI, i.e., VREF is expected to be VVI/2.

Figure 9:
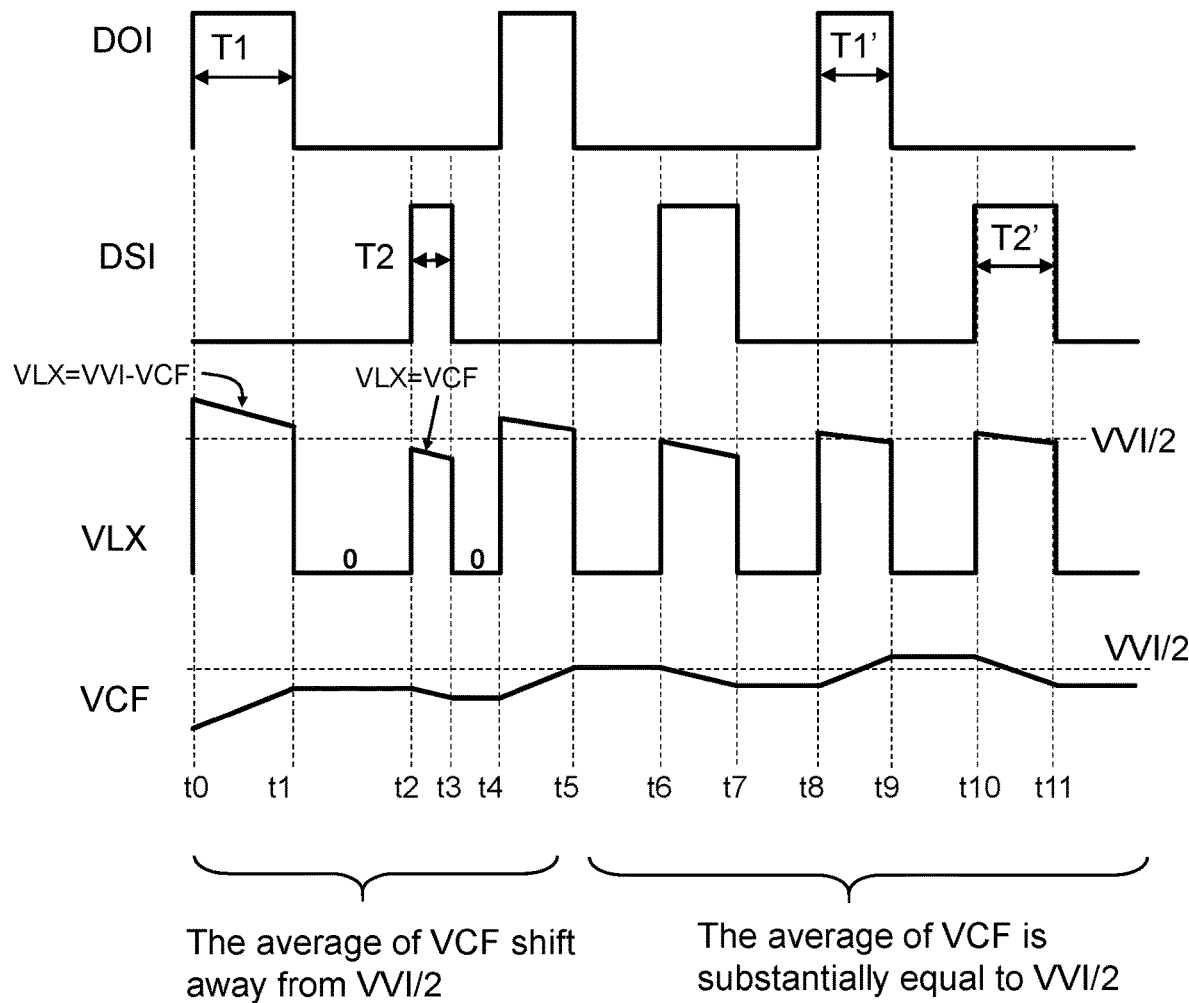
FIG. 9 shows operating waveforms of the multi-level switching power converter according to the present invention.

FIG. 9 shows operating waveforms of the multi-level switching power converter according to the present invention (e.g. corresponding to FIGS. 6A and 6B). As shown in FIG. 9, due to the non-ideality of the circuitry as described earlier, the voltage VLX on the switching node LX is higher than its expected level VVI/2 during the time period t0-t1, and is lower than its expected level VVI/2 during the time period t2-t3. At the same time, the average of the voltage VCF across the conversion capacitor CF also drifts away from its expected level VVI/2 (e.g. lower than VVI/2 during t0-t4). More specifically, during time period t0-t1, since the voltage VLX on the switching node LX is determined by the difference between the input voltage VVI and the voltage VCF of the conversion capacitor CF, and since the average of the voltage VCF across the conversion capacitor CF is lower than VVI2/during t0-t4 as shown in FIG. 9, the voltage VLX on the switching node LX is higher than VVI/2 during t0-t1. On the other hand, due to the same reason, the voltage VLX on the switching node LX is lower than VVI/2 during t2-t3.

According to the present invention, the adjusting circuit 150 can adjust the first time period T1 of the first pulse modulation signal DOI. For example, a first time period T1 which is too long (e.g. t0-t1) can be gradually adjusted by the adjusting circuit 150 with feedback control, so that the time length is reduced to a shorter first time period T1' (t8-t9), whereby the voltage VLX on the switching node LX will be shifted to the expected level VVI/2 (corresponding to the proportion voltage level VVI/2) during time periods T1' (t8-t9) and T2' (t10-t11). At the same time, the average of the voltage VCF across the capacitor CF is also feedback-controlled to the level of the reference voltage VREF (i.e. VREF=VVI/2 in this embodiment). Thus, as shown in FIG. 9, the average of the voltage VCF across the capacitor CF is substantially equal to VVI/2 during the period t8-t11.

Note that, although it is preferred for the average of the voltage VCF across the conversion capacitor CF to be exactly equal to the level of the reference voltage VREF, however due to non-idealities caused by for example imperfection of components or imperfect matching among components, the average of the voltage VCF across the conversion capacitor CF may not be exactly equal to the level of the reference voltage VREF, but just close to the level of the reference voltage VREF, and therefore the word "substantially" is used, meaning that there can be certain tolerable error.

FIG. 6B shows a schematic diagram of another specific embodiment of the multi-level switching power converter (multi-level switching power converter 6B) according to the present invention. In this embodiment, the controller circuit 100 further includes another adjusting circuit 160. The adjusting circuit 160 generates the second adjusting signal ADJ2 according to a difference between the voltage VCF across the conversion capacitor CF and the reference voltage VREF to control another timer circuit 140 to adjust the second time period T2 such that the average of the voltage VCF across the conversion capacitor CF is substantially equal to the level of the reference voltage VREF. Note that, in this embodiment, the direction of adjusting the second time period T2 by the second adjusting signal ADJ2 is complementary to the direction of adjusting the first time period T1 by the first adjusting signal ADJ1.

As shown in FIG. 9 (corresponded to FIG. 6B), according to the present invention, the adjusting circuit 160 can adjust the second time period T2 of the second pulse modulation signal DSI. For example, a second time period T2 (e.g. t2-t3) which is shorter than expected can be gradually adjusted by the adjusting circuit 160 with feedback control to a longer second time period T2' (t10-t11), such that the voltage VLX on the switching node LX is shifted to the expected level VVI/2 (corresponding to the proportion voltage level VVI/2) during time periods T1' (t8-t9) and T2' (t10-t11). At the same time, the average of the voltage VCF across the capacitor CF is also feedback-controlled to the level of the reference voltage VREF (i.e. VREF=VVI/2 in this embodiment). For example, as shown in FIG. 9, the average of the voltage VCF across the capacitor CF is substantially equal to VVI/2 during the period t8-t11.

Note that, the term "complementary" as used in the description "the direction of adjusting the second time period T2 by the second adjusting signal ADJ2 is complementary to the direction of adjusting the first time period T1 by the first adjusting signal ADJ1" indicates that, as shown in FIG. 9, the adjusting circuit 150 increases the first time period T1 and the adjusting circuit 160 decreases the second time period T2, or oppositely, the adjusting circuit 150 decreases the first time period T1 and the adjusting circuit 160 increases the second time period T2, whereby the feedback loop operates faster to reach the target. In one embodiment, the complementary control can be achieved by complementary coupling arrangement on the input terminals. For example, as shown in FIG. 6B, the first input terminal IN1 of the adjusting circuit 150 is coupled to the voltage VCF across the conversion capacitor CF, and the second input terminal IN2 of the adjusting circuit 150 is coupled to the reference voltage VREF. On the other hand, complementarily, the first input terminal IN1 of the adjusting circuit 160 is coupled to the reference voltage VREF, and the second input terminal IN2 of the adjusting circuit 160 is coupled to the voltage VCF across the conversion capacitor CF, such that the complementary control as described earlier can be achieved.

Figure 6C:
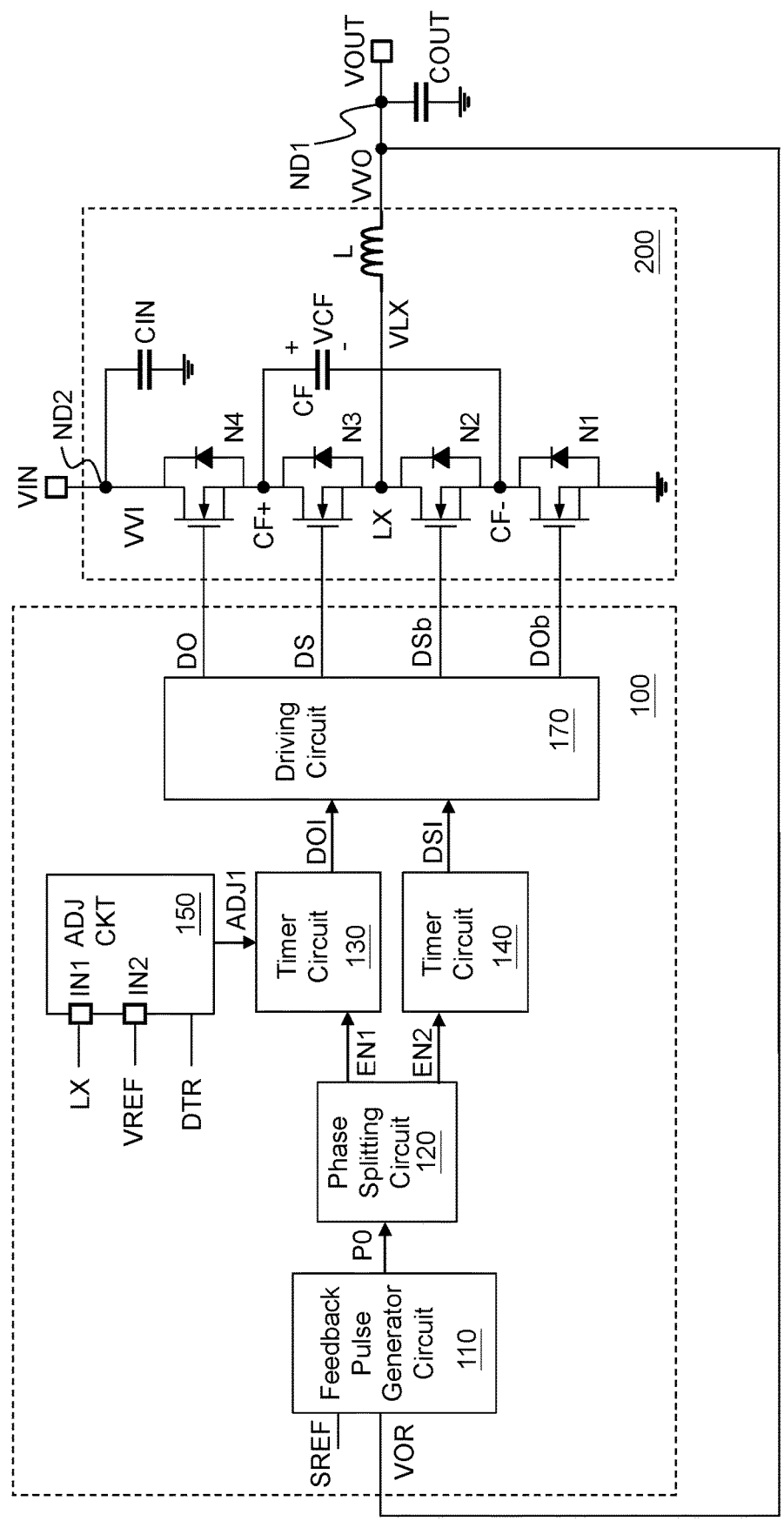
FIGS. 6C-6E show schematic diagrams of other specific embodiments of the multi-level switching power converter according to the present invention.
Figure 6D:
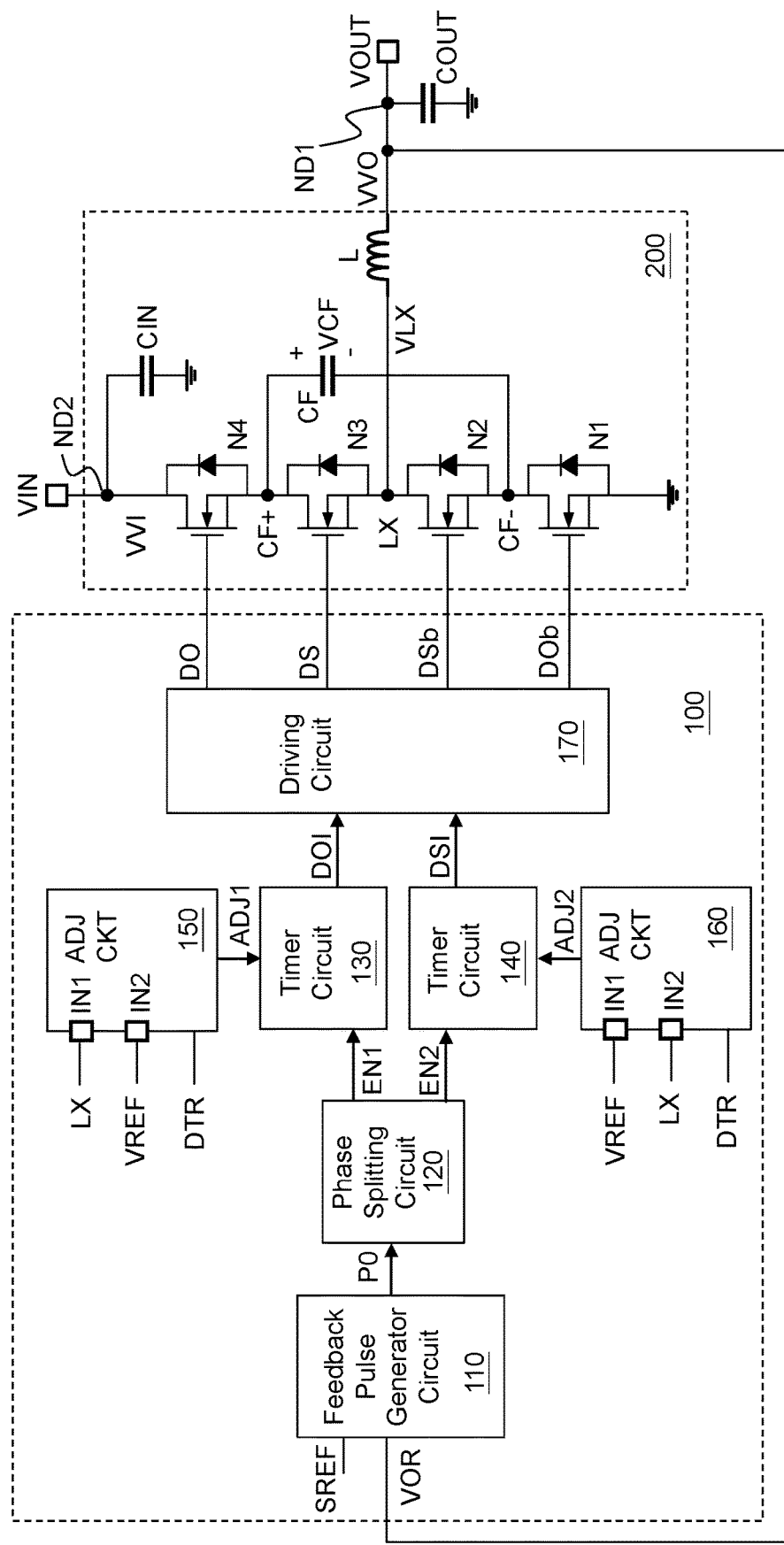
Figure 6E:
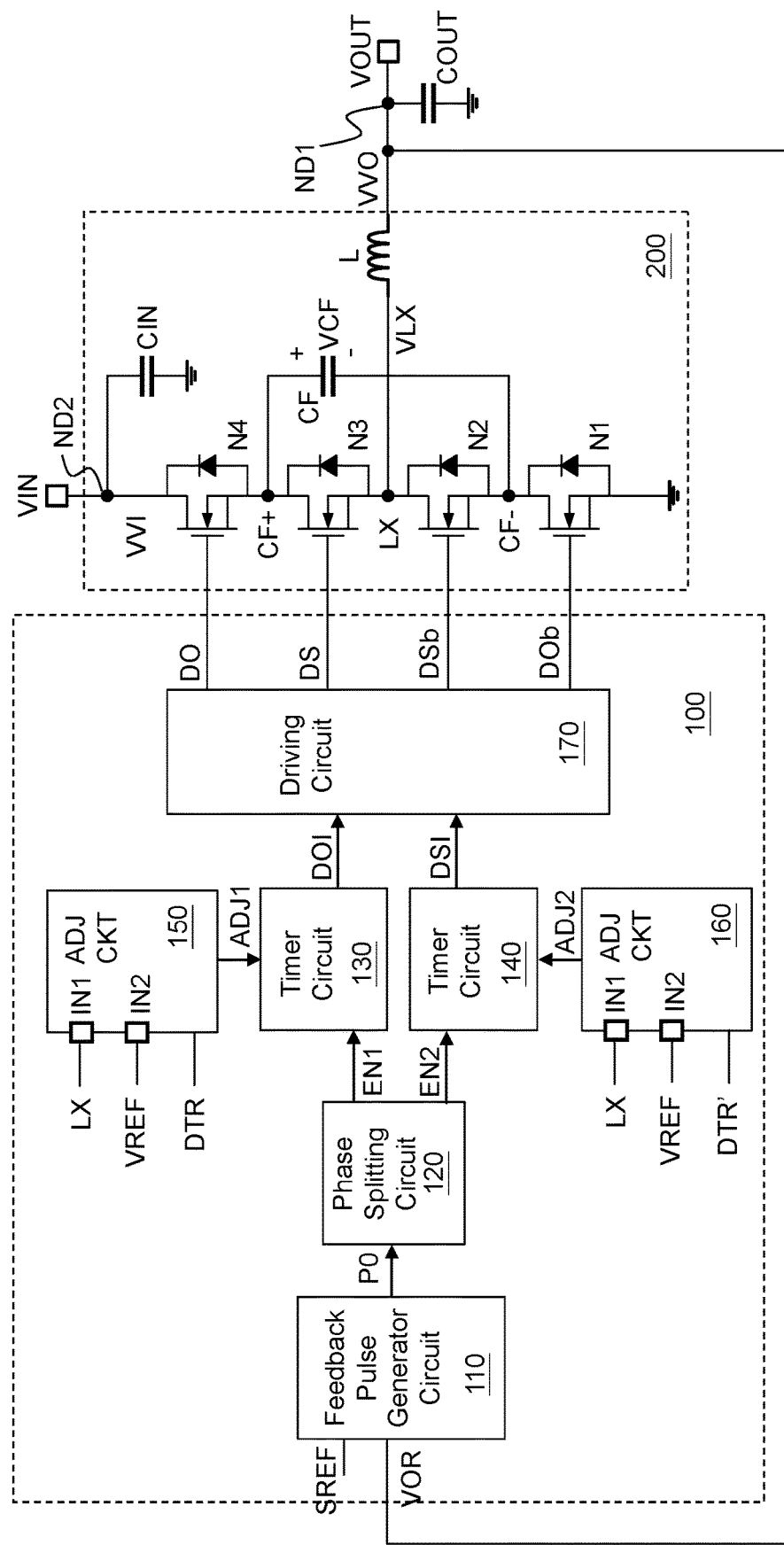

FIGS. 6C-6E show schematic diagrams of other specific embodiments of the multi-level switching power converter according to the present invention (multi-level switching power converters 6C-6E). FIG. 6C shows an embodiment which is similar to the embodiment of FIG. 6A, but the adjusting circuit 150 operates according to different inputs. The operation of the adjusting circuit 150 in FIG. 6C is similar to the operation of the adjusting circuit 150 in FIG. 6D. The embodiment of FIG. 6C can be regarded as a variant of FIG. 6D without complementary control. The details as to how the adjusting circuit 150 in FIGS. 6C and 6D operates will be explained below.

The multi-level switching power converter 6D is similar to the embodiment shown in 6B with the following difference. The adjusting circuit 150 of the multi-level switching power converter 6D generates the first adjusting signal ADJ1 according to the difference between a voltage VLX on the switching node LX and the reference voltage VREF to control the timer circuit 130 to adjust the first time period T1, and adjusting circuit 160 of the multi-level switching power converter 6D generates the second adjusting signal ADJ2 according to the difference between a voltage VLX on the switching node LX and the reference voltage VREF to control the timer circuit 140 to adjust the second time period T2, such that the proportion voltage level is substantially equal to the level of the reference voltage VREF. In other words, in this embodiment, the proportion voltage level is substantially equal to VVI/2. Note that, in this embodiment, the direction of adjusting the second time period T2 by the second adjusting signal ADJ2 is complementary to the direction of adjusting the first time period T1 by the first adjusting signal ADJ1.

More specifically, as shown in FIG. 6D, in one embodiment, the first input terminal IN1 of the adjusting circuit 150 is coupled to the switching node LX (to obtain the voltage VLX), and the second input terminal IN2 of the adjusting circuit 150 is coupled to the reference voltage VREF. On the other hand, complementarily, the first input terminal IN1 of the adjusting circuit 160 is coupled to the reference voltage VREF, and the second input terminal IN2 of the adjusting circuit 160 is coupled to the switching node LX, such that the complementary control as described earlier can be achieved.

Still referring to FIG. 6D, in this embodiment, since the voltage VLX of the switching node LX switches among different voltage levels, hence preferably, the adjusting circuits 150 and 160 generate the first adjusting signal ADJ1 and the second adjusting signal ADJ2 further according the duty ratio related signal DTR. More specifically, the duty ratio related signal DTR controls the adjusting circuits 150 and 160 such that the first adjusting signal ADJ1 and the second adjusting signal ADJ2 respond to the difference between the voltage VLX on the switching node LX and the reference voltage VREF only when the switching node LX is electrically connected to the proportion voltage level.

Referring to FIGS. 5 and 9 which correspond to the embodiment of FIG. 6D, the duty ratio related signal DTR corresponds to for example the first state as shown in FIG. 5 (e.g. corresponding to the first pulse modulation signal DOI as shown in FIG. 9), or to the second state as shown in FIG. 5 (e.g. corresponding to the second pulse modulation signal DSI as shown in FIG. 9). In other words, the switching node LX is electrically connected to the proportion voltage level in these states, instead of being connected to the input power VIN or the ground level. In summary, the duty ratio related signal DTR relates to the duty ratio of the plural power switches.

The aforementioned complementary control is not limited to the configuration as shown in FIG. 6D. In one embodiment, as shown in FIG. 6E, the first input terminal IN1 of the adjusting circuit 150 is coupled to the switching node LX (to obtain the voltage VLX), and the second input terminal IN2 of the adjusting circuit 150 is coupled to the reference voltage VREF. On the other hand, complementarily, the first input terminal IN1 of the adjusting circuit 160 is coupled to the switching node LX, and the second input terminal IN2 of the adjusting circuit 160 is coupled to the reference voltage VREF. And the adjusting circuit 150 and the adjusting circuit 160 generate the first adjusting signal ADJ1 and the second adjusting signal ADJ2 according to the duty ratio related signal DTR and the DTR' respectively. In this embodiment, the duty ratio related signal DTR corresponds to for example the first state (e.g. corresponding to the first pulse modulation signal DOI as shown in FIG. 9), and the duty ratio related signal DTR' corresponds to for example the second state (e.g. corresponding to the second pulse modulation signal DSI as shown in FIG. 9), such that similar complementary control as described earlier can be achieved in an alternative manner.

The complementary control as described above is not mandatory. For example, the adjusting circuit 160 can be omitted (as shown in FIG. 6C) and the adjusting can be performed only by the adjusting circuit 150. In this case, the adjusting circuit 150 generates the first adjusting signal ADJ1 to control the timer circuit 130 to adjust the first time period T1, such that the proportion voltage level is substantially equal to a level of the reference voltage VREF. The rest of the embodiment of FIG. 6C is similar to FIG. 6A.

Figure 10A:
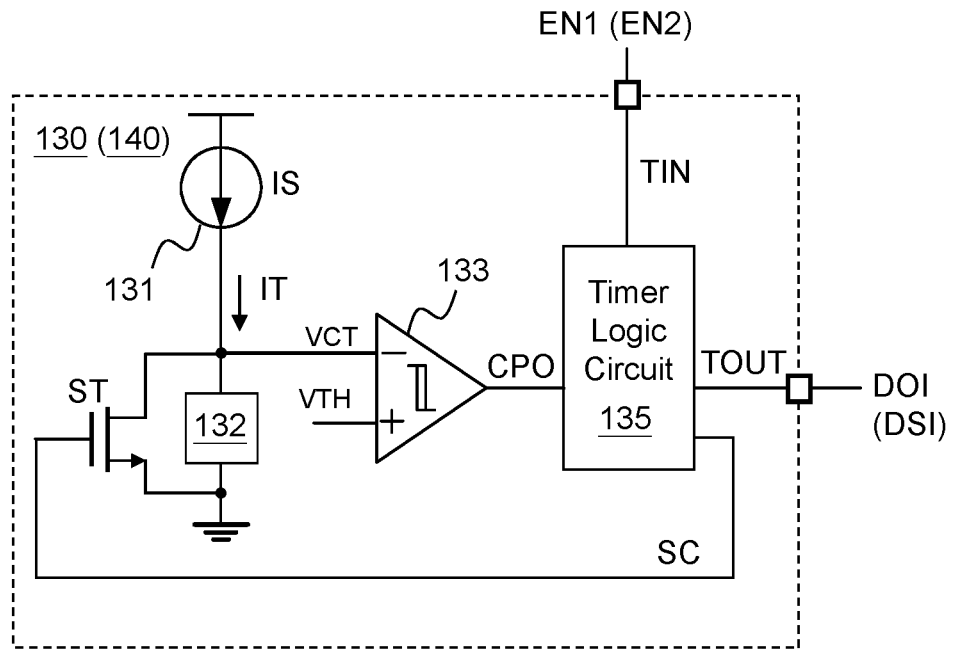
FIG. 10A shows a schematic diagram of a specific embodiment of the timer circuit of the multi-level switching power converter according to the present invention.

FIG. 10A shows a schematic diagram of a specific embodiment of the timer circuit (timer circuit 130 or 140) of the multi-level switching power converter according to the present invention. The timer circuit 130 includes a current source 131, a timer capacitor circuit 132, a timer comparison circuit 133 and a timer logic circuit 135.

The current source 131 is configured to operably provide a predetermined current IS. The timer capacitor circuit 132 is configured to operably generate an integration signal VCT according to a timer current IT, wherein the timer current IT relates to the predetermined current IS. In the embodiment shown in FIG. 10A, when the adjusting circuit does not adjust the timer current IT, the timer current IT is equal to the predetermined current IS.

The timer comparison circuit 133 is configured to operably generate a timer comparison signal CPO according to the integration signal VCT and a threshold voltage VTH. Note that the circuit arrangement of the positive and negative input terminals shown in the figure is for illustrating and not for limiting the scope of the present invention. In one embodiment, the timer comparison circuit 133 can further include hysteresis function to improve its noise immunity. Certainly, the hysteresis function is not necessarily required and can be omitted in other embodiments.

The timer logic circuit 135 is configured to operably generate a timer output signal TOUT according to a timer input signal TIN and the integration signal VCT, wherein the timer output signal TOUT has a predetermined time period, and the time length of the predetermined time period is determined by the timer circuit 130 according to the timer current IT, a capacitance of the timer capacitor circuit 132, and a level of the threshold voltage VTH.

In one embodiment, as shown in FIG. 10A, the timer input signal TIN of the timer circuit 130 corresponds to the first phase pulse EN1, and the timer output signal TOUT of the timer circuit 130 corresponds to the first pulse modulation signal DOI, and the predetermined time period of the timer output signal TOUT of the timer circuit 130 corresponds to the first time period T1. Note that, the circuit arrangement of the embodiment shown in FIG. 10A can be applied to the timer circuit 140, with the correspondences marked in the parentheses in the figure. More specifically, the timer input signal TIN of the timer circuit 140 corresponds to the second phase pulse EN2, and the timer output signal TOUT of the timer circuit 140 corresponds to the second pulse modulation signal DSI, and the predetermined time period of the timer output signal TOUT of the timer circuit 140 corresponds to the second time period T2.

Figure 10B:
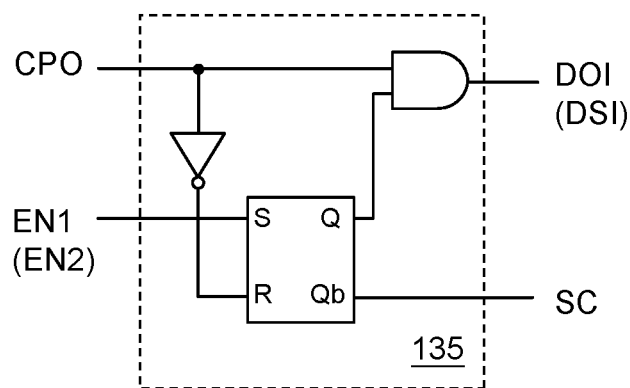
FIG. 10B shows a schematic diagram of a specific embodiment of the timer logic circuit of the multi-level switching power converter according to the present invention.

FIG. 10B shows a schematic diagram of a specific embodiment of the timer logic circuit (timer logic circuit 135) of the multi-level switching power converter according to the present invention. In this embodiment, the timer logic circuit 135 includes a latch circuit (e.g. the S-R latch circuit as shown in FIG. 10B), and several logic gates (e.g. the inverter and the AND gate as shown in FIG. 10B). The inverting output signal Qb of the S-R latch circuit controls the reset switch ST shown in FIG. 10A to reset the integration signal VCT. Similarly, the circuit in FIG. 10B can be applied to the timer circuit 140, with the correspondences marked in the parentheses in the figure.

Figure 11A:
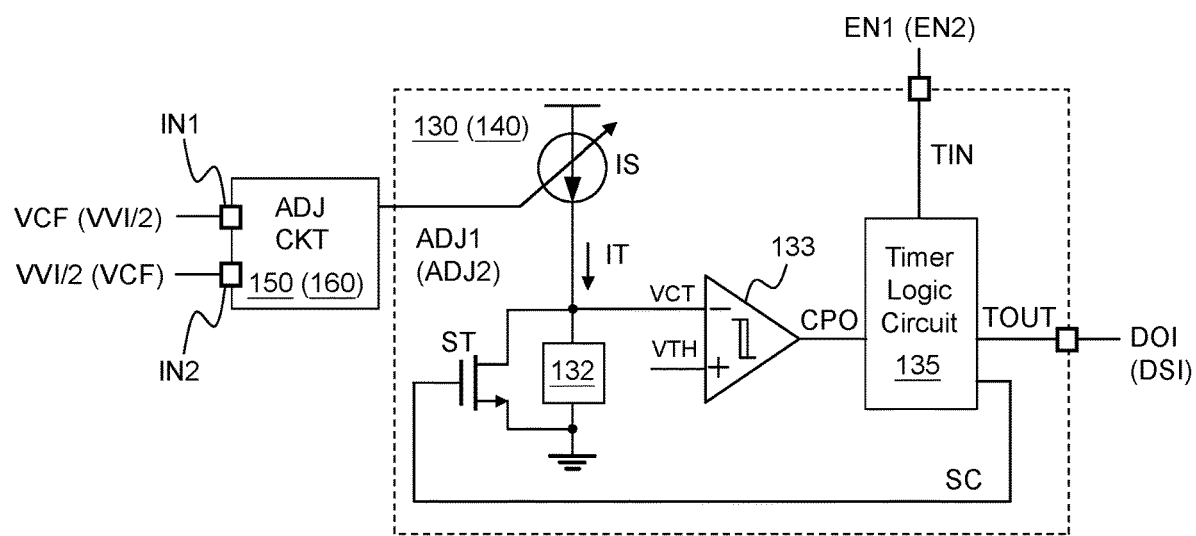
FIGS. 11A-11C show schematic diagrams of several specific embodiments of the timer circuit and the adjusting circuit of the multi-level switching power converter according to the present invention.
Figure 11B:
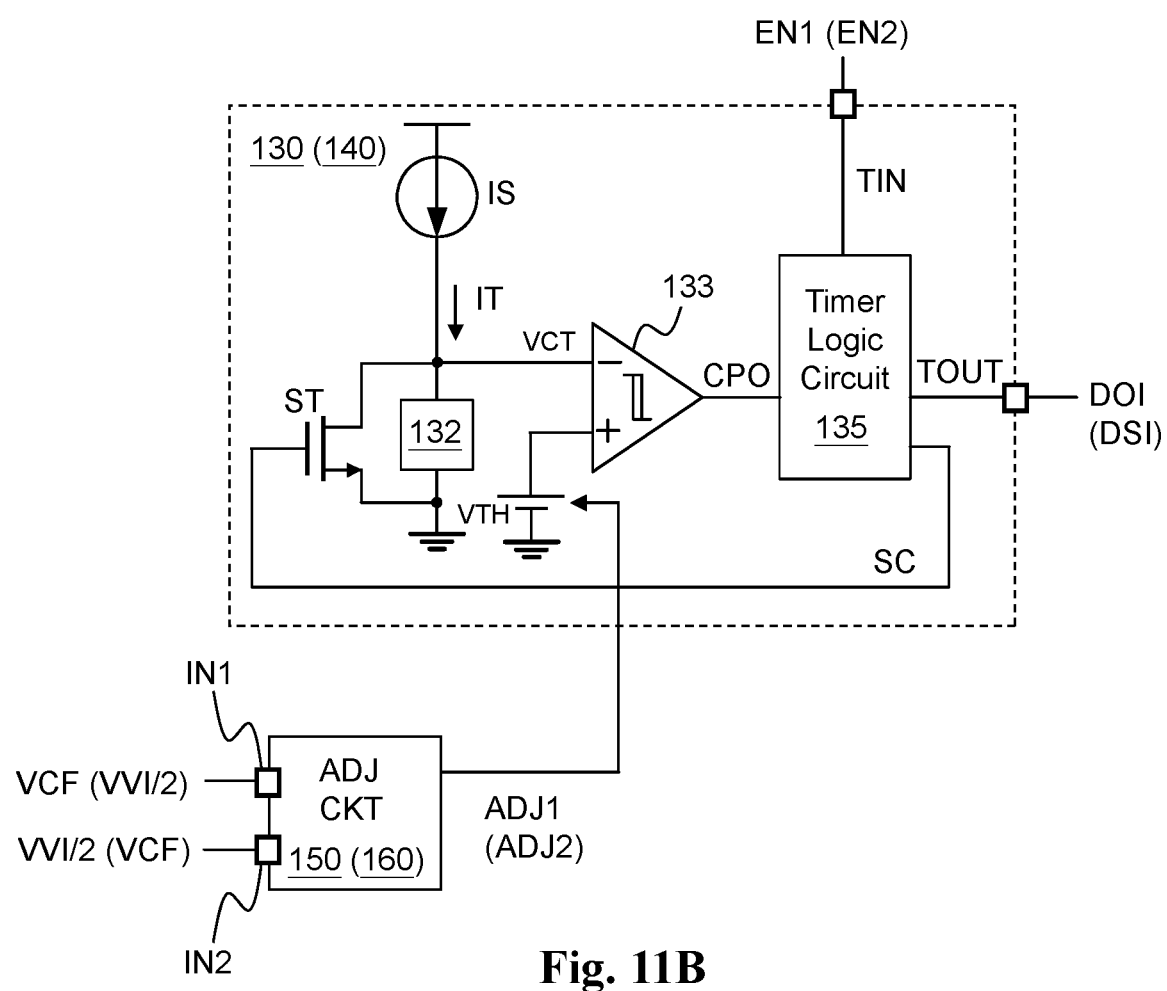
Figure 11C:
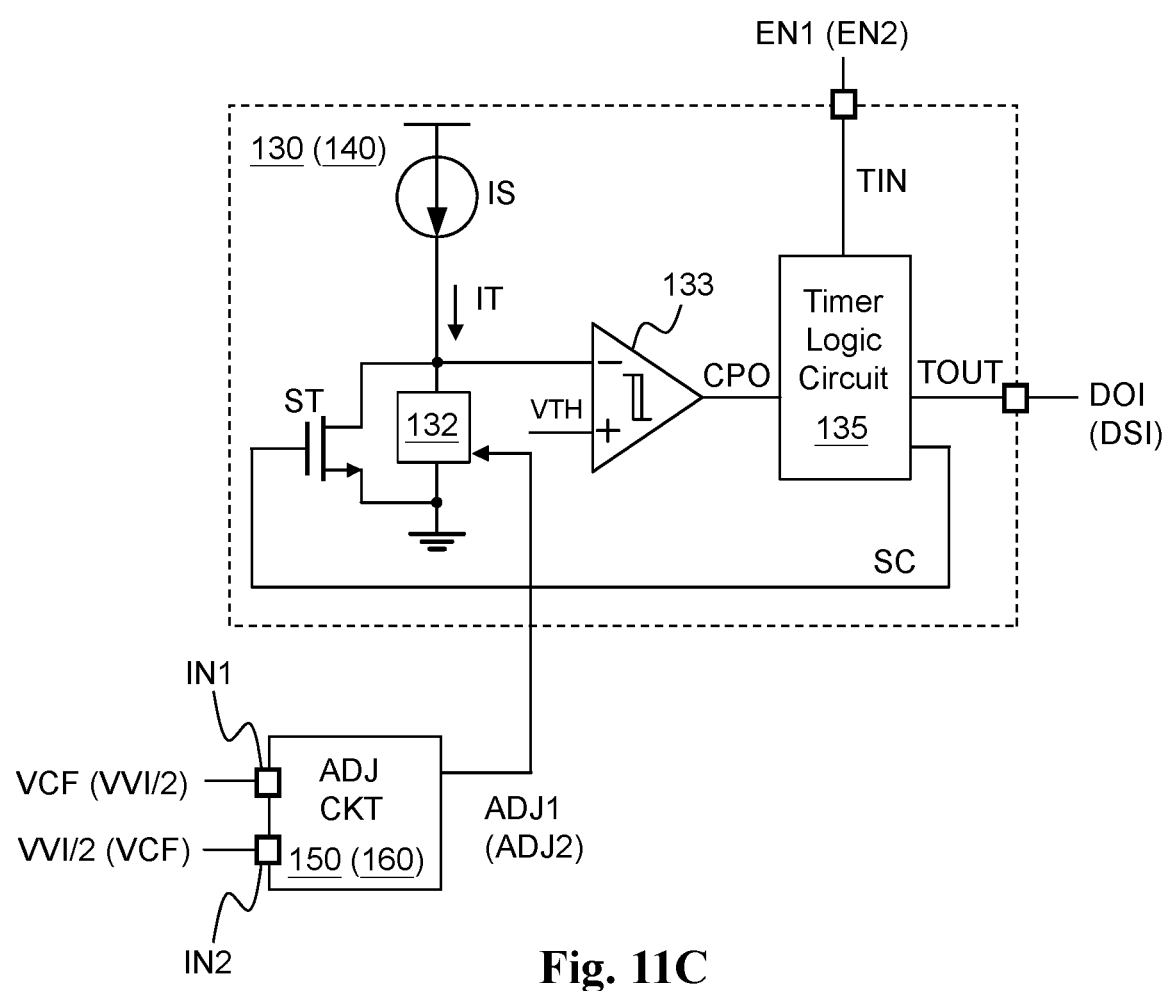

FIGS. 11A-11C show schematic diagrams of several specific embodiments of the timer circuit (timer circuit 130 or 140) and the adjusting circuit (adjusting circuit 150 or 160) of the multi-level switching power converter according to the present invention. According to the present invention, the timer circuit 130 adjusts the first time period T1 according to the first adjusting signal ADJ1 by at least one of the following ways:
(1) the first adjusting signal ADJ1 adjusting the timer current IT to adjust the first time period T1 (FIG. 11A), for example by adjusting the predetermined current IS directly or by increasing or decreasing the timer current IT by shunting;
(2) the first adjusting signal ADJ1 adjusting the threshold voltage VTH to adjust the first time period T1 (FIG. 11B); or
(3) the first adjusting signal ADJ1 adjusting the capacitance of the timer capacitor circuit 132 in an analog or digital manner to adjust the first time period T1 (FIG. 11C); or a combination of the above. Note that, the first adjusting signal ADJ1 generated by the adjusting circuit 150 will be in corresponding different forms in correspondence to the above different ways for adjusting the first time period T1.

Likely, the adjusting circuit 160 can be configured to adjust the second time period T2 by generating the second adjusting signal ADJ2 to control the timer circuit 140 with a similar way as described above. The corresponding signal coupling arrangement is marked in the parentheses shown in FIGS. 11A-11C. Also note that, in one embodiment, the input terminals of the adjusting circuit 160 can be interchanged to achieve the aforementioned complementary adjustment control. More specifically, as an example, the first input terminal IN1 of the adjusting circuit 160 can be coupled to the reference voltage VREF (corresponding to VVI/2) and the second input terminal IN2 of the adjusting circuit 160 can be coupled to the voltage VCF across the conversion capacitor CF.

Note that, the embodiments shown in FIGS. 11A-11C correspond to FIG. 6B, wherein the adjusting circuit 150 or 160 generates the adjusting signals ADJ1 or ADJ2 according to the difference between the voltage VCF across the conversion capacitor CF and the reference voltage VREF.

Figure 11D:
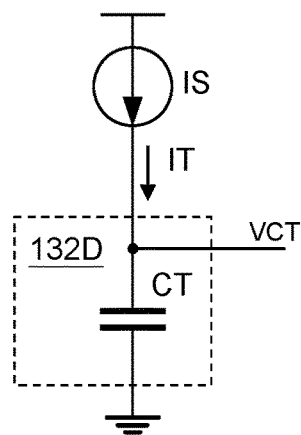
FIGS. 11D-11F show schematic diagrams of several specific embodiments of the timer capacitor circuit of the multi-level switching power converter according to the present invention.
Figure 11E:
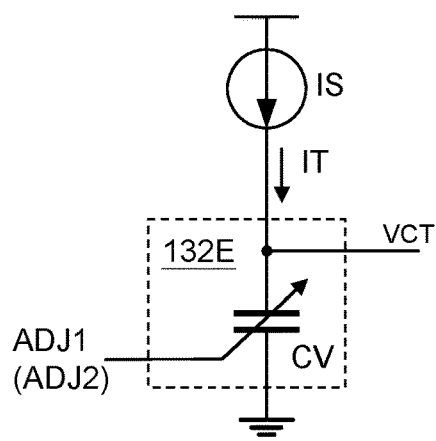
Figure 11F:
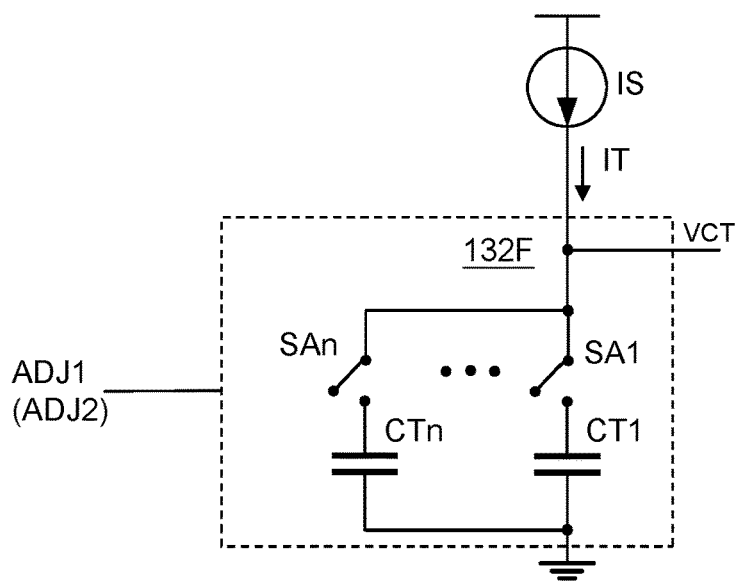
Figure 11G:
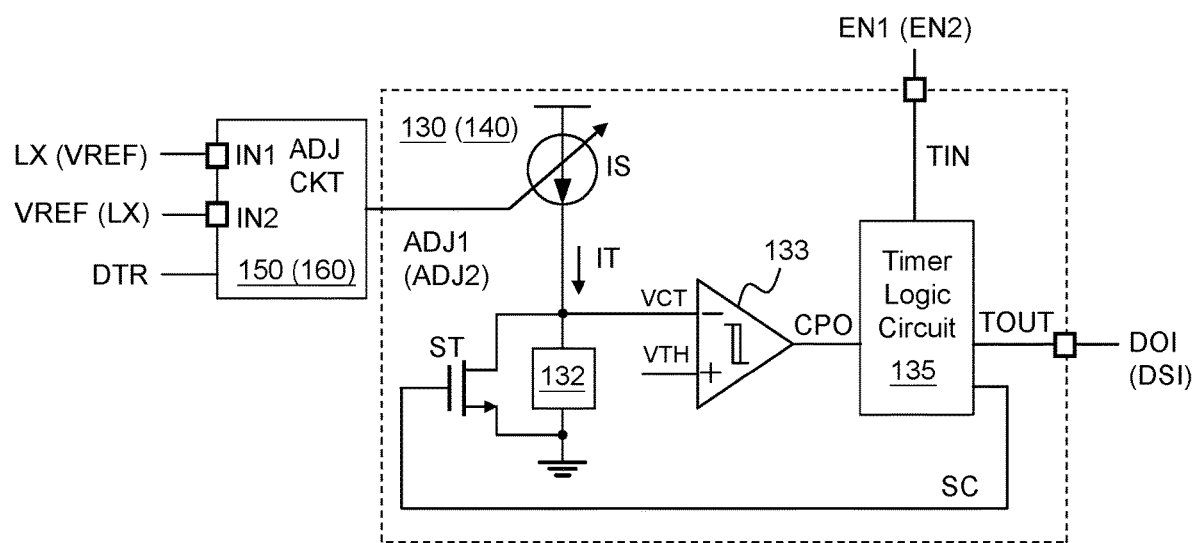
FIG. 11G shows a schematic diagram of another specific embodiment of the timer circuit and the adjusting circuit of the multi-level switching power converter according to the present invention.

FIG. 11G shows a schematic diagram of another specific embodiment of the timer circuit and the adjusting circuit of the multi-level switching power converter according to the present invention. This embodiment corresponds to the embodiment shown in FIG. 6D; more specifically, the adjusting circuit 150 or 160 generates the adjusting signals ADJ1 or ADJ2 according to the difference between the voltage VLX of the switching node LX and the reference voltage VREF, and the duty ratio related signal DTR. The first time period T1 and the second time period T2 can be adjusted by the adjusting signal ADJ1 and the adjusting signal ADJ2 respectively for example as in the embodiments of FIGS. 11A-11C.

FIGS. 11D-11F show schematic diagrams of several specific embodiments of the timer capacitor circuit (132D-132F, corresponding to different embodiments of the aforementioned timer capacitor circuit 132) of the multi-level switching power converter according to the present invention.

As shown in FIG. 11D, in one embodiment, the timer capacitor circuit 132D includes a capacitor CT having fixed capacitance.

As shown in FIG. 11E, in one embodiment, the timer capacitor circuit 132E includes a varactor CV. In one embodiment, the varactor CV can be embodied as a voltage controlled variable capacitor, wherein the capacitance of the timer capacitor circuit 132E can be adjusted continuously in an analog manner by the first or the second adjusting signals ADJ1 or ADJ2. In another preferred embodiment, the varactor CV can be a varactor diode.

As shown in FIG. 11F, in another embodiment, the timer capacitor circuit 132F includes a capacitor network having a variable capacitance. The capacitor network includes plural capacitors (CT1-CTn, n is a positive integer larger than 2) and switches (SA1-SAn) which can be controlled to be ON or OFF by the first or the second adjusting signals ADJ1 or ADJ2, thereby adjusting the equivalent capacitance of the timer capacitor circuit 132F in digital manner. In this embodiment, the first and the second adjusting signals ADJ are digital signals.

Figure 12A:
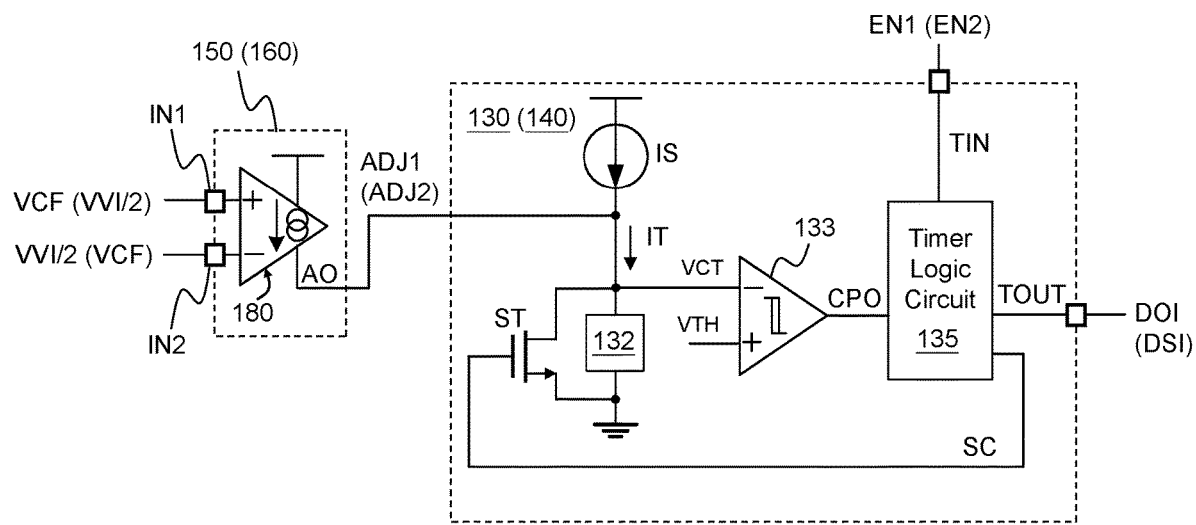
FIGS. 12A-12B show schematic diagrams of several specific embodiments of the timer circuit and the adjusting circuit of the multi-level switching power converter according to the present invention.
Figure 12B:
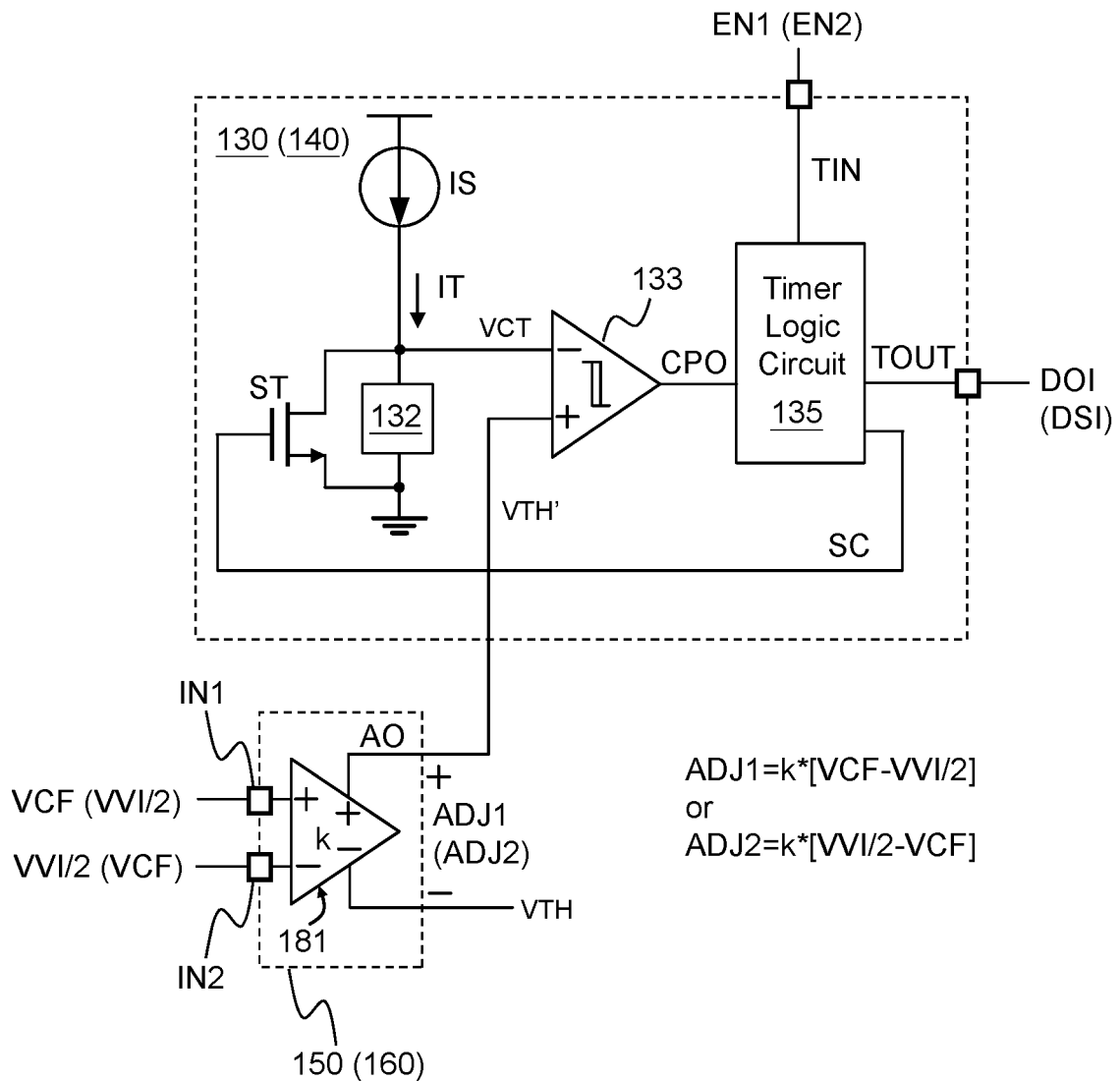

FIGS. 12A-12B show schematic diagrams of several specific embodiments of the timer circuit (timer circuit 130 or 140) and the adjusting circuit (adjusting circuit 150 or 160) of the multi-level switching power converter according to the present invention.

In one embodiment, as shown in FIG. 12A, the adjusting circuit 150 includes a transconductor circuit 180. The transconductor circuit 180 is configured to operably generate the adjusting output signal AO according to the difference between the voltage VCF across the conversion capacitor CF and the reference voltage VREF, wherein the adjusting output signal AO is in current form (i.e., AO is a current signal) and provides a current branch shunted to the path from the current source to the timer capacitor circuit 132 to adjust the timer current IT. In this embodiment, the adjusting output signal AO corresponds to the first adjusting signal ADJ1.

In one embodiment, as shown in FIG. 12B, the adjusting circuit 150 includes a voltage gain circuit 181. The voltage gain circuit 181 is configured to operably generate the adjusting output signal AO according to the difference between the voltage VCF across the conversion capacitor CF and the reference voltage VREF (e.g. the adjusting output signal AO is k times the difference, wherein k is a real number), wherein the adjusting output signal AO corresponds to the first adjusting signal ADJ1. In this embodiment, the adjusting output signal AO is in voltage form (i.e., AO is a voltage signal) for adjusting the threshold voltage VTH. In this embodiment, a threshold voltage VTH' is generated by summing the threshold voltage VTH and the first adjusting signal ADJ1 (AO) and the threshold voltage VTH' serves to adjust the first time period T1. In one embodiment, the voltage gain circuit 181 can be embodied as an amplifier, or in another embodiment, the voltage gain circuit 181 can be embodied as a voltage divider.

Note that, FIGS. 12A-12B are also applicable to the timer circuit 140 and the adjusting circuit 160 and the numbers/symbols in the parentheses shown in FIGS. 12A-12B correspond to the timer circuit 140 and the adjusting circuit 160. Also note that, the coupling arrangements of the positive and negative terminals of the transconductor circuit 180 and the voltage gain circuit 181 are for illustrating purpose but not for limiting the scope of the present invention.

Figure 12C:
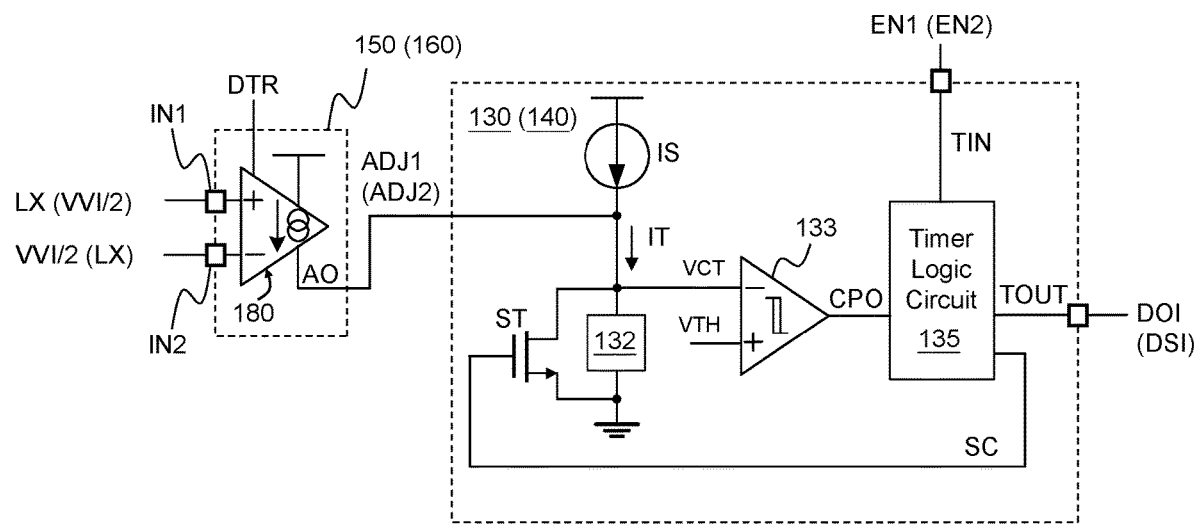
FIG. 12C shows a schematic diagram of another specific embodiment of the timer circuit and the adjusting circuit of the multi-level switching power converter according to the present invention.

FIG. 12C shows a schematic diagram of another specific embodiment of the timer circuit (timer circuit 130 or 140) and the adjusting circuit (adjusting circuit 150 or 160) of the multi-level switching power converter according to the present invention.

In one embodiment, as shown in FIG. 12C, the adjusting circuit 150 includes a transconductor circuit 180. The transconductor circuit 180 is configured to operably generate the adjusting output signal AO according to the difference between the voltage VLX on the switching node LX and the reference voltage VREF, and the duty ratio related signal DTR, wherein the adjusting output signal AO is in current form (i.e., AO is a current signal) and provides a current branch shunted to the current source and the timer capacitor circuit 132 to adjust the timer current IT. In this embodiment, the adjusting output signal AO corresponds to the first adjusting signal ADJ1. Note that, in this embodiment shown in FIG. 12C, the adjusting output signal AO responds to the difference between the voltage VLX on the switching node LX and the reference voltage VREF only during the enable period of the duty ratio related signal DTR (e.g. corresponding to the aforementioned first state).

Those skilled in this art should be able to understand according to the teaching of the present invention that the embodiments shown and illustrated in FIGS. 11C, 12B and 12C can be applied in combination or separately, for adjusting the capacitance of the timer capacitor circuit 132 or adjusting the threshold voltage VTH according to the difference between the voltage VLX of the switching node LX and the reference voltage VREF, and the duty ratio related signal DTR, to adjust the first time period or the second time period.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by voltage-to-current conversion, current-to-voltage conversion, and/or ratio conversion, etc. before an action is performed. The spirit of the present invention should cover all such and other modifications and variations, which should be interpreted to fall within the scope of the following claims and their equivalents.

What is claimed is:

1. A multi-level switching power converter, comprising: a multi-level power stage circuit, configured to operably convert an input power to an output power by multi-level power conversion; and a controller circuit, configured to operably control the multi-level power stage circuit; wherein the multi-level power stage circuit includes: an inductor, coupled between a switching node and a first node; a conversion capacitor, configured to operably generate at least one proportion voltage level by capacitive voltage division; and plural power switches, coupled to the inductor and the conversion capacitor, and configured to operably control the coupling arrangement of the inductor and the conversion capacitor, such that the switching node is switched among the at least one proportion voltage level, a second node, and a third node, so that the multi-level power conversion is achieved, wherein a voltage across the conversion capacitor determines the at least one proportion voltage level; wherein the first node, the second node and the third node are configured as one of the followings: (1) the first node is coupled to the output power, the second node is coupled to the input power, and the third node is coupled to ground level, whereby the multi-level power stage circuit operates as a buck power stage circuit; (2) the first node is coupled to the input power, the second node is coupled to the output power, and the third node is coupled to the ground level, whereby the multi-level power stage circuit operates as a boost power stage circuit; or, (3) the first node is coupled to the ground level, the second node is coupled to the input power, and the third node is coupled to the output power, whereby the multi-level power stage circuit operates as an inverting buck-boost power stage circuit; wherein the controller circuit includes: a feedback pulse generator circuit, configured to operably generate a trigger pulse according to an output related signal and a reference signal, wherein the output related signal relates to the output power; a phase splitting circuit, configured to operably generate at least a first phase pulse and a second phase pulse according to the trigger pulse; plural timer circuits, coupled to the phase splitting circuit, wherein a first one of the plural timer circuits is configured to operably determine a first time period and generate a first pulse modulation signal according to the first phase pulse and the first time period, and a second one of the plural timer circuits is configured to operably determine a second time period and generate a second pulse modulation signal according to the second phase pulse and the second time period; and an adjusting circuit, configured to operate as one of the followings: (1) the adjusting circuit generating a first adjusting signal according to a difference between the voltage across the conversion capacitor and a reference voltage to control the timer circuit to adjust the first time period such that an average of the voltage across the conversion capacitor is substantially equal to a level of the reference voltage; or (2) the adjusting circuit generating the first adjusting signal according to a difference between a voltage on the switching node and a reference voltage, and a duty ratio related signal, to control the timer circuit to adjust the first time period such that the proportion voltage level is substantially equal to the level of the reference voltage, wherein the duty ratio related signal relates to a duty ratio of the plural power switches.

2. The multi-level switching power converter of claim 1, wherein the controller circuit further includes another adjusting circuit, configured to operate as one of the followings:
  (1) the another adjusting circuit generating a second adjusting signal according to the difference between the voltage across the conversion capacitor and the reference voltage to control the second timer circuit to adjust the second time period such that the average of the voltage across the conversion capacitor is substantially equal to the level of the reference voltage; or
  (2) the another adjusting circuit generating the second adjusting signal according to the difference between the voltage on the switching node and the reference voltage, and the duty ratio related signal, to control the second timer circuit to adjust the second time period such that the proportion voltage level is substantially equal to the level of the reference voltage;
  wherein a direction of adjusting the second time period by the second adjusting signal is complementary to a direction of adjusting the first time period by the first adjusting signal.

3. The multi-level switching power converter of claim 1, wherein the timer circuit includes:
  a current source, configured to operably provide a predetermined current;
  a timer capacitor circuit, configured to operably generate an integration signal according to a timer current, wherein the timer current relates to the predetermined current;
  a timer comparison circuit, configured to operably generate a timer comparison signal according to the integration signal and a threshold voltage; and
  a timer logic circuit, configured to operably generate a timer output signal according to a timer input signal and the integration signal, wherein the timer output signal has a predetermined time period, and a time length of the predetermined time period is determined by the timer circuit according to the timer current, a capacitance of the timer capacitor circuit, and a level of the threshold voltage;
  wherein the timer input signal of the timer circuit corresponds to the first phase pulse, and the timer output signal corresponds to the first pulse modulation signal, and the predetermined time period corresponds to the first time period.

4. The multi-level switching power converter of claim 3, wherein the timer circuit adjusts the first time period according to the first adjusting signal by at least one of the following ways:
  (1) the first adjusting signal adjusting the timer current to adjust the first time period;
  (2) the first adjusting signal adjusting the threshold voltage to adjust the first time period; or
  (3) the first adjusting signal adjusting the capacitance of the timer capacitor circuit in an analog or digital manner to adjust the first time period.

5. The multi-level switching power converter of claim 4, wherein the adjusting circuit includes at least one of the followings:
  (1) a transconductor circuit, configured to operate as one of the followings: (1a) generating an adjusting output signal according to the difference between the voltage across the conversion capacitor and the reference voltage; or (1b) generating the adjusting output signal according to the difference between the voltage on the switching node and the reference voltage, and the duty ratio related signal, wherein the adjusting output signal is in current form and provides a current branch shunted to the current source and the timer capacitor circuit to adjust the timer current; or
  (2) a voltage gain circuit, configured to operate as one of the followings: (2a) generating the adjusting output signal according to the difference between the voltage across the conversion capacitor and the reference voltage; or (2b) generating the adjusting output signal according to the difference between the voltage on the switching node and the reference voltage, and the duty ratio related signal, wherein the adjusting output signal is in voltage form and is configured to adjust the threshold voltage;
  wherein the adjusting output signal corresponds to the first adjusting signal.

6. The multi-level switching power converter of claim 1, wherein the first pulse modulation signal and the second pulse modulation signal control the plural power switches such that the power stage circuit operates in one of the following states:
  (1) a first state: the inductor and the conversion capacitor being electrically connected in series between the second node and the first node, wherein one terminal of the conversion capacitor is electrically connected to the switching node, and the other terminal of the conversion capacitor is electrically connected to the second node;
  (2) a second state: the inductor being electrically connected between the third node and the first node;
  (3) a third state: the inductor and the conversion capacitor being electrically connected in series between the third node and the first node, wherein the terminal of the conversion capacitor is electrically connected to the third node, and the other terminal of the conversion capacitor is electrically connected to the switching node; or
  (4) a fourth state: the inductor being electrically connected between the second node and the first node;
  wherein the first pulse modulation signal controls the power stage circuit to operate in the first state in the first time period, and the second pulse modulation signal controls the power stage circuit to operate in the third state in the second time period; or
  the first pulse modulation signal controls the power stage circuit to operate in the fourth state outside the first time period, and the second pulse modulation signal controls the power stage circuit to operate in the second state outside the second time period.

7. The multi-level switching power converter of claim 1, wherein: when the multi-level power stage circuit operates as the buck power stage circuit, the switching node is switched between the output power and the proportion voltage level, or the switching node is switched between the ground level and the proportion voltage level, wherein the level of the reference voltage is ½ of an input voltage of the input power; when the multi-level power stage circuit operates as the boost power stage circuit, the switching node is switched between the output power and the proportion voltage level, or the switching node is switched between the ground level and the proportion voltage level, wherein the level of the reference voltage is ½ of an output voltage of the output power; or when the multi-level power stage circuit operates as the inverting buck-boost power stage circuit, the switching node is switched between the output power and the proportion voltage level, or the switching node is switched between the input power and the proportion voltage level, wherein the level of the reference voltage is ½ of a difference between the input voltage and the output voltage.

8. The multi-level switching power converter of claim 1, wherein the feedback pulse generator circuit includes:
- an error amplifier circuit, configured to operably generate an error amplified signal according to the difference between the output related signal and the reference signal; and
- a modulation comparison circuit, configured to operably compare the error amplified signal and a ramp signal to generate the trigger pulse.

9. A controller circuit for use in controlling a multi-level switching power converter to convert an input power to an output power by multi-level power conversion, the multi-level power converter including: an inductor, coupled between a switching node and a first node; a conversion capacitor, configured to operably generate at least one proportion voltage level by capacitive voltage division; and plural power switches, coupled to the inductor and the conversion capacitor, and configured to operably control the coupling arrangement of the inductor and the conversion capacitor, such that the switching node is switched among the at least one proportion voltage level, a second node, and a third node, so that the multi-level power conversion is achieved, wherein a voltage across the conversion capacitor determines the at least one proportion voltage level; wherein the first node, the second node and the third node are configured as one of the followings: (1) the first node is coupled to the output power, the second node is coupled to the input power, and the third node is coupled to ground level, whereby the multi-level power stage circuit operates as a buck power stage circuit; (2) the first node is coupled to the input power, the second node is coupled to the output power, and the third node is coupled to the ground level, whereby the multi-level power stage circuit operates as a boost power stage circuit; or, (3) the first node is coupled to the ground level, the second node is coupled to the input power, and the third node is coupled to the output power, whereby the multi-level power stage circuit operates as an inverting buck-boost power stage circuit; the controller circuit comprising: a feedback pulse generator circuit, configured to operably generate a trigger pulse according to an output related signal and a reference signal, wherein the output related signal relates to the output power; a phase splitting circuit, configured to operably generate at least a first phase pulse and a second phase pulse according to the trigger pulse; plural timer circuits, coupled to the phase splitting circuit, wherein a first one of the plural timer circuits is configured to operably determine a first time period and generate a first pulse modulation signal according to the first phase pulse and the first time period, and a second one of the plural timer circuits is configured to operably determine a second time period and generate a second pulse modulation signal according to the second phase pulse and the second time period; and an adjusting circuit, configured to operate as one of the followings: (1) the adjusting circuit generating a first adjusting signal according to a difference between the voltage across the conversion capacitor and a reference voltage to control the timer circuit to adjust the first time period such that an average of the voltage across the conversion capacitor is substantially equal to a level of the reference voltage; or (2) the adjusting circuit generating the first adjusting signal according to a difference between a voltage on the switching node and a reference voltage, and a duty ratio related signal, to control the timer circuit to adjust the first time period such that the proportion voltage level is substantially equal to the level of the reference voltage, wherein the duty ratio related signal relates to a duty ratio of the plural power switches.

10. The controller circuit of claim 9, further comprising another adjusting circuit, configured to operate as one of the followings:
- (1) the another adjusting circuit generating a second adjusting signal according to the difference between the voltage across the conversion capacitor and the reference voltage to control the second timer circuit to adjust the second time period such that the average of the voltage across the conversion capacitor is substantially equal to the level of the reference voltage; or
- (2) the another adjusting circuit generating the second adjusting signal according to the difference between the voltage on the switching node and the reference voltage, and the duty ratio related signal, to control the second timer circuit to adjust the second time period such that the proportion voltage level is substantially equal to the level of the reference voltage;

wherein a direction of adjusting the second time period by the second adjusting signal is complementary to a direction of adjusting the first time period by the first adjusting signal.

11. The controller circuit of claim 9, wherein the timer circuit includes:
- a current source, configured to operably provide a predetermined current;
- a timer capacitor circuit, configured to operably generate an integration signal according to a timer current, wherein the timer current relates to the predetermined current;
- a timer comparison circuit, configured to operably generate a timer comparison signal according to the integration signal and a threshold voltage; and
- a timer logic circuit, configured to operably generate a timer output signal according to a timer input signal and the integration signal, wherein the timer output signal has a predetermined time period, and a time length of the predetermined time period is determined by the timer circuit according to the timer current, a capacitance of the timer capacitor circuit, and a level of the threshold voltage;

wherein the timer input signal of the timer circuit corresponds to the first phase pulse, and the timer output signal corresponds to the first pulse modulation signal, and the predetermined time period corresponds to the first time period.

12. The controller circuit of claim 11, wherein the timer circuit adjusts the first time period according to the first adjusting signal by at least one of the following ways:
- (1) the first adjusting signal adjusting the timer current to adjust the first time period;
- (2) the first adjusting signal adjusting the threshold voltage to adjust the first time period; or
- (3) the first adjusting signal adjusting the capacitance of the timer capacitor circuit in an analog or digital manner to adjust the first time period.

13. The controller circuit of claim 12, wherein the adjusting circuit includes at least one of the followings:
- (1) a transconductor circuit, configured to operate as one of the followings: (1a) generating an adjusting output signal according to the difference between the voltage across the conversion capacitor and the reference voltage; or (1b) generating the adjusting output signal according to the difference between the voltage on the switching node and the reference voltage, and the duty ratio related signal, wherein the adjusting output signal is in current form and provides a current branch shunted to the current source and the timer capacitor circuit to adjust the timer current; or (2) a voltage gain circuit, configured to operate as one of the followings: (2a) generating the adjusting output signal according to the difference between the voltage across the conversion capacitor and the reference voltage; or (2b) generating the adjusting output signal according to the difference between the voltage on the switching node and the reference voltage, and the duty ratio related signal, wherein the adjusting output signal is in voltage form and is configured to adjust the threshold voltage;

wherein the adjusting output signal corresponds to the first adjusting signal.

14. The controller circuit of claim 9, wherein the first pulse modulation signal and the second pulse modulation signal control the plural power switches such that the power converter operates in one of the following states:

(1) a first state: the inductor and the conversion capacitor being electrically connected in series between the second node and the first node, wherein one terminal of the conversion capacitor is electrically connected to the switching node, and the other terminal of the conversion capacitor is electrically connected to the second node;

(2) a second state: the inductor being electrically connected between the third node and the first node;

(3) a third state: the inductor and the conversion capacitor being electrically connected in series between the third node and the first node, wherein the terminal of the conversion capacitor is electrically connected to the third node, and the other terminal of the conversion capacitor is electrically connected to the switching node; or (4) a fourth state: the inductor being electrically connected between the second node and the first node;

wherein the first pulse modulation signal controls the power converter to operate in the first state in the first time period, and the second pulse modulation signal controls the power converter to operate in the third state in the second time period; or the first pulse modulation signal controls the power converter to operate in the fourth state outside the first time period, and the second pulse modulation signal controls the power converter to operate in the second state outside the second time period.

15. The controller circuit of claim 9, wherein: when the multi-level power stage circuit operates as the buck power stage circuit, the switching node is switched between the output power and the proportion voltage level, or the switching node is switched between the ground level and the proportion voltage level, wherein the level of the reference voltage is ½ of an input voltage of the input power; when the multi-level power stage circuit operates as the boost power stage circuit, the switching node is switched between the output power and the proportion voltage level, or the switching node is switched between the ground level and the proportion voltage level, wherein the level of the reference voltage is ½ of an output voltage of the output power; or when the multi-level power stage circuit operates as the inverting buck-boost power stage circuit, the switching node is switched between the output power and the proportion voltage level, or the switching node is switched between the input power and the proportion voltage level, wherein the level of the reference voltage is ½ of a difference between the input voltage and the output voltage.

16. The controller circuit of claim 9, wherein the feedback pulse generator circuit includes:

an error amplifier circuit, configured to operably generate an error amplified signal according to the difference between the output related signal and the reference signal; and a modulation comparison circuit, configured to operably compare the error amplified signal and a ramp signal to generate the trigger pulse.

17. A control method for controlling a multi-level switching power converter to convert an input power to an output power by multi-level power conversion, wherein the multi-level power converter includes: an inductor, coupled between a switching node and a first node; a conversion capacitor, configured to operably generate at least one proportion voltage level by capacitive voltage division; and plural power switches, coupled to the inductor and the conversion capacitor, and configured to operably control the coupling arrangement of the inductor and the conversion capacitor, such that the switching node is switched among the at least one proportion voltage level, a second node, and a third node, so that the multi-level power conversion is achieved, wherein a voltage across the conversion capacitor determines the at least one proportion voltage level; wherein the first node, the second node and the third node are configured as one of the followings: (1) the first node is coupled to the output power, the second node is coupled to the input power, and the third node is coupled to ground level, whereby the multi-level power stage circuit operates as a buck power stage circuit; (2) the first node is coupled to the input power, the second node is coupled to the output power, and the third node is coupled to the ground level, whereby the multi-level power stage circuit operates as a boost power stage circuit; or, (3) the first node is coupled to the ground level, the second node is coupled to the input power, and the third node is coupled to the output power, whereby the multi-level power stage circuit operates as an inverting buck-boost power stage circuit; the control method comprising: generating a trigger pulse according to an output related signal and a reference signal, wherein the output related signal relates to the output power; generating at least a first phase pulse and a second phase pulse according to the trigger pulse; determining a first time period and generating a first pulse modulation signal according to the first phase pulse and the first time period; determining a second time period and generating a second pulse modulation signal according to the second phase pulse and the second time period; and performing one of the followings: adjusting the first time period according to a difference between the voltage across the conversion capacitor and a reference voltage such that an average of the voltage across the conversion capacitor is substantially equal to a level of the reference voltage; or adjusting the first time period according to a difference between a voltage on the switching node and a reference voltage, and a duty ratio related signal, such that the proportion voltage level is substantially equal to the level of the reference voltage, wherein the duty ratio related signal relates to a duty ratio of the plural power switches.

18. The control method of claim 17, further comprising one of the followings:

(1) adjusting the second time period according to the difference between the voltage across the conversion capacitor and the reference voltage such that the average of the voltage across the conversion capacitor is substantially equal to the level of the reference voltage; or (2) adjusting the second time period according to the difference between the voltage on the switching node and the reference voltage, and the duty ratio related signal, such that the proportion voltage level is substantially equal to the level of the reference voltage;

wherein a direction of adjusting the second time period by the second adjusting signal is complementary to a direction of adjusting the first time period by the first adjusting signal.

* * * * *